(12) United States Patent
Stahler, Sr.

(10) Patent No.: US 6,328,319 B1
(45) Date of Patent: Dec. 11, 2001

(54) HAND TRUCK CONVERTIBLE TO A CART

(75) Inventor: Richard D. Stahler, Sr., Mantua, NJ (US)

(73) Assignee: Wesco Industrial Products, Inc., Lansdale, PA (US)

( * ) Notice: Subject to any disclaimer, the term of this patent is extended or adjusted under 35 U.S.C. 154(b) by 0 days.

(21) Appl. No.: 09/527,493

(22) Filed: Mar. 16, 2000

(51) Int. Cl.[7] .................................................. B62B 1/00
(52) U.S. Cl. .................................. 280/47.18; 280/47.27; 280/652
(58) Field of Search ............................ 280/30, 651, 652, 280/643, 47.18, 654, 655, 655.1, 43.1, 659, 47.131, 47.2, 47.24, 47.27, 47.28, 47.35, 47.34, 79.11, 79.3; D34/12, 26; 108/11, 15, 18; 187/231; 182/20

(56) References Cited

U.S. PATENT DOCUMENTS

| | | | | |
|---|---|---|---|---|
| 1,716,611 | * | 6/1929 | Wilson | 280/30 |
| 3,008,463 | * | 11/1961 | Frank | 108/11 |
| 3,064,989 | * | 11/1962 | Bellows | 280/30 X |
| 3,785,669 | * | 1/1974 | Doheny | 280/47.18 |
| 4,284,286 | * | 8/1981 | Lewallen | 280/30 |
| 4,565,382 | * | 1/1986 | Sherman | 280/47.18 |
| 5,306,027 | * | 4/1994 | Cheng | 280/30 |
| 5,452,908 | * | 9/1995 | Bencic | 280/47.35 |
| 5,536,034 | * | 7/1996 | Miller | 280/651 |
| 5,642,895 | * | 7/1997 | Wunder | 280/30 |
| 5,957,472 | * | 9/1999 | Borgatti | 280/30 |
| 6,152,462 | * | 11/2000 | Barrett | 280/30 |

FOREIGN PATENT DOCUMENTS

150655 * 7/1955 (FI) .
411558 * 1/1996 (JP) .

OTHER PUBLICATIONS

Internet Web Site www.wescomfg.com—printout from web site showing convertible Westco handcarts.*
Internet Web Site www.STIC.net/Users/Alzar/6GSA.W12, htm—rintout showing Westco "cobra" handcart convertable to a table model number CBR–FBL–SHDC.*
Flyer/Advertisement for product entitled "Remin Kart–a–Bag® Kartmaster© HD 500"—Date and Publication Unknown; Kart–a–Bag® Kartmaster©; admitted prior art.
Flyer/Advertisement for product entitled "Kart–a–Bag® Kartmaster© HD 500 II"—Date and Publication Unknown; Kart–a–Bag® Kartmaster©; admitted prior art.

* cited by examiner

Primary Examiner—Brian L. Johnson
Assistant Examiner—Bryan Fischmann
(74) Attorney, Agent, or Firm—Akin, Gump, Strauss, Hauer & Feld, LLP

(57) ABSTRACT

A hand truck which is convertible into a cart having an elevated tabletop surface. The hand truck has a primary frame which includes a first pair of wheels rotatably mounted thereon. The hand truck has at least one additional wheel adapted to allow the hand truck to be used as a cart. The primary frame is generally parallel to a supporting surface while the hand truck is being used as a cart. The improvement to the hand truck includes a plate movably attached to the primary frame and movable between a first position, generally parallel to and contacting the primary frame, and a second position, generally parallel to and spaced apart from the primary frame, forming the tabletop surface.

10 Claims, 23 Drawing Sheets

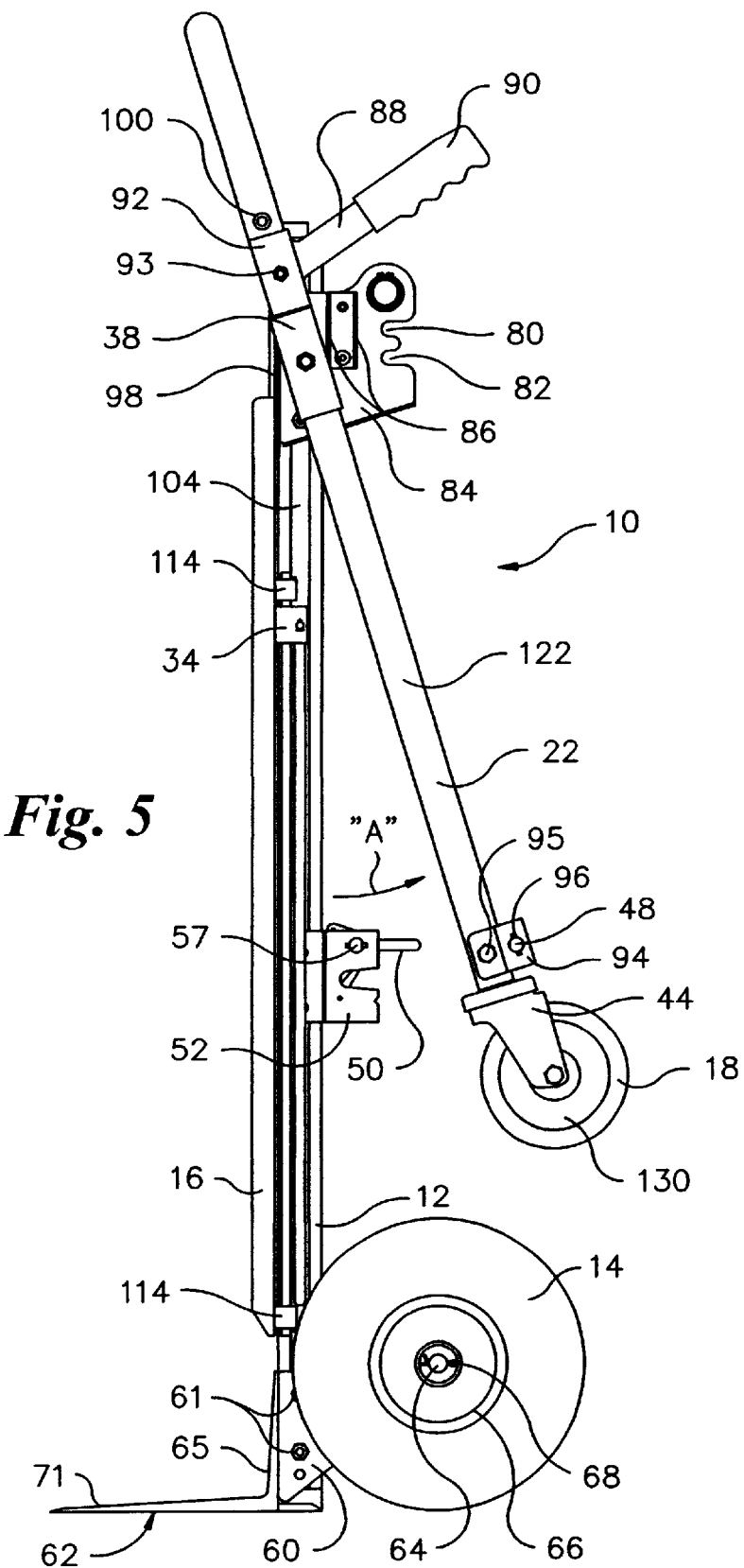

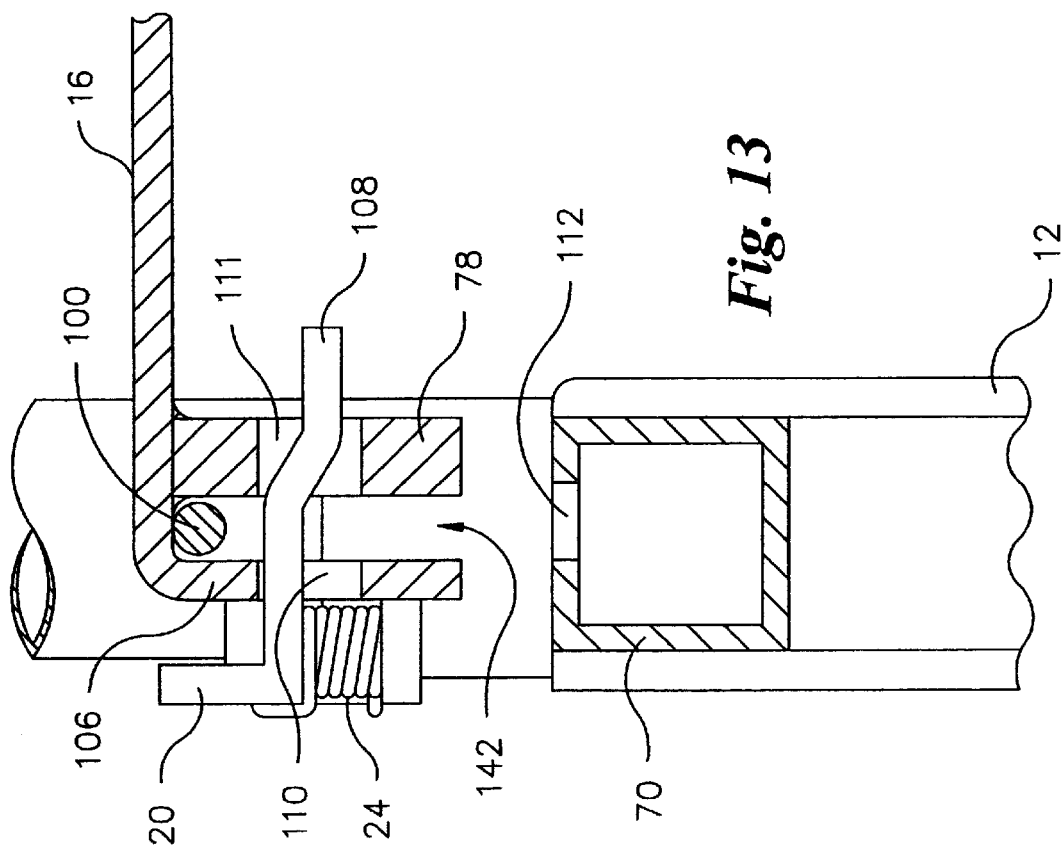
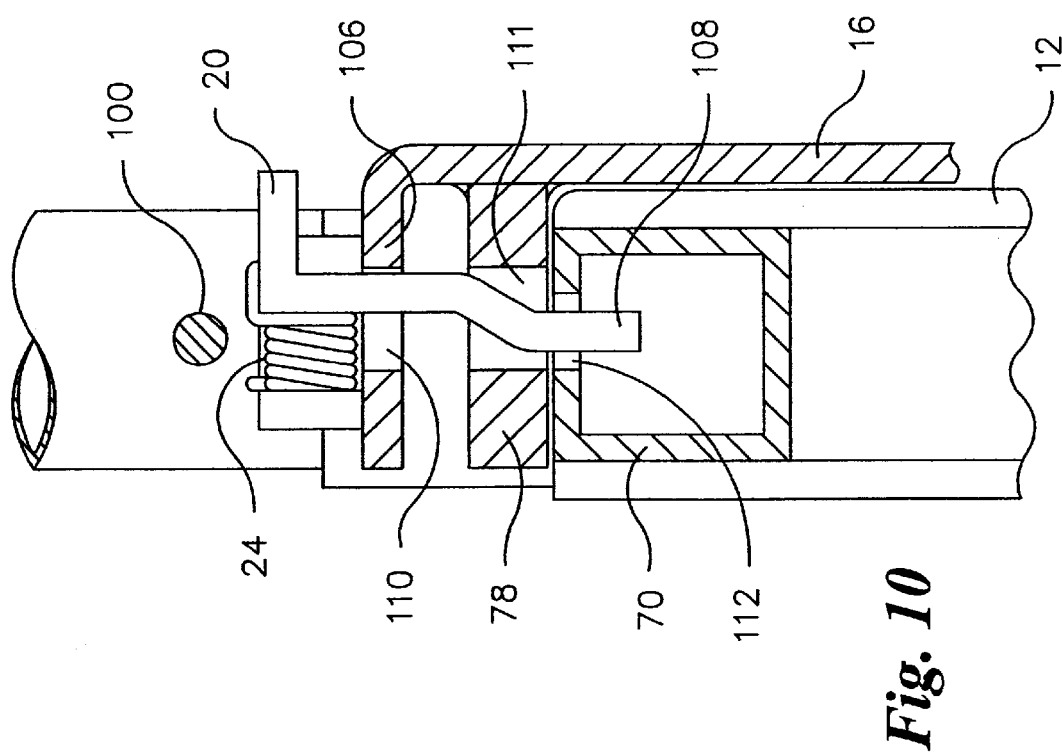

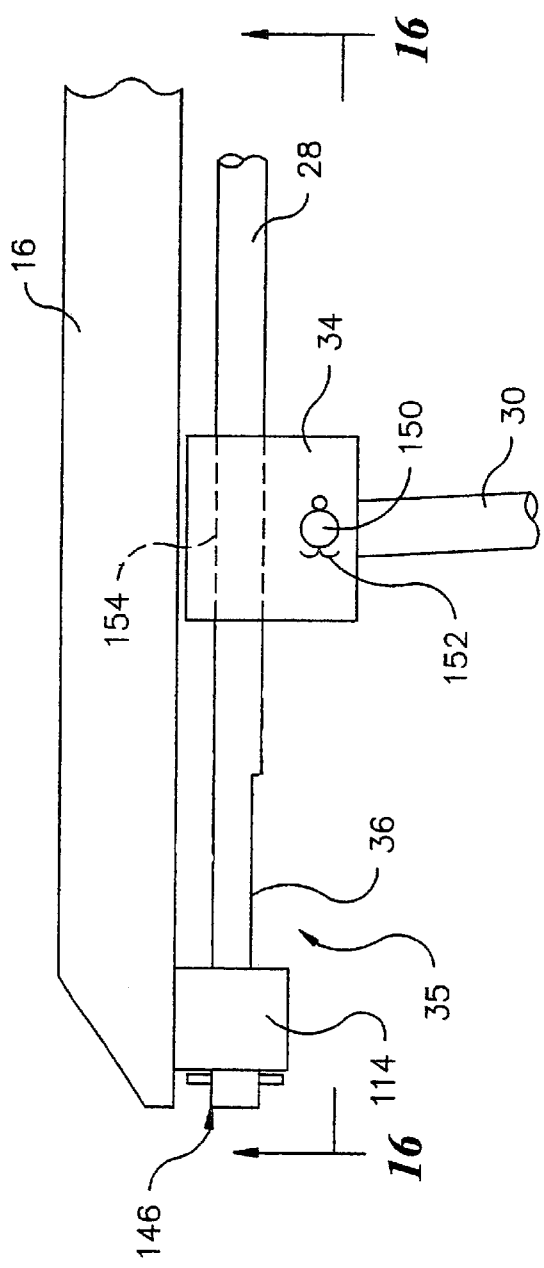
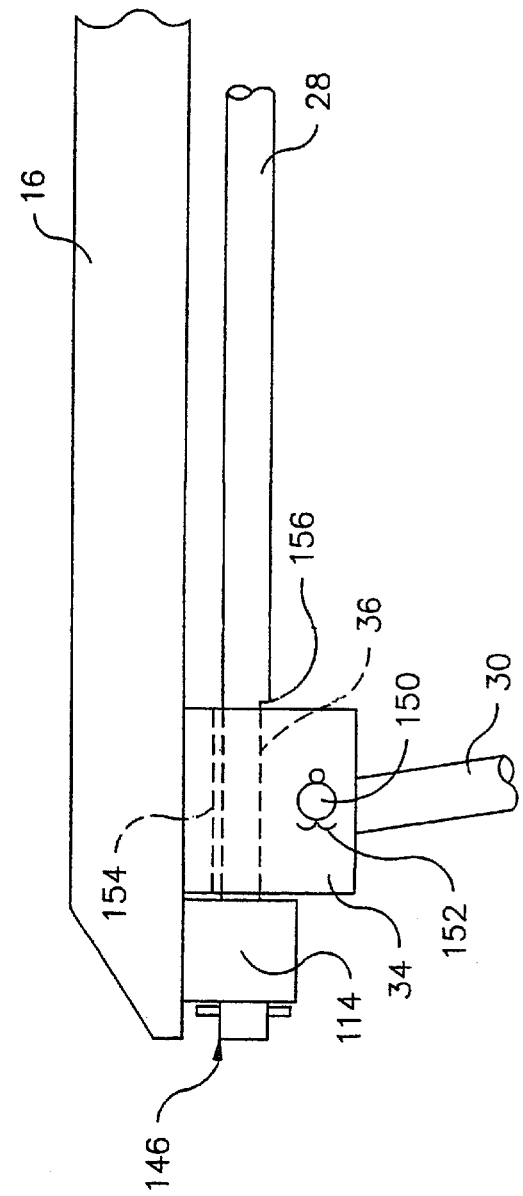

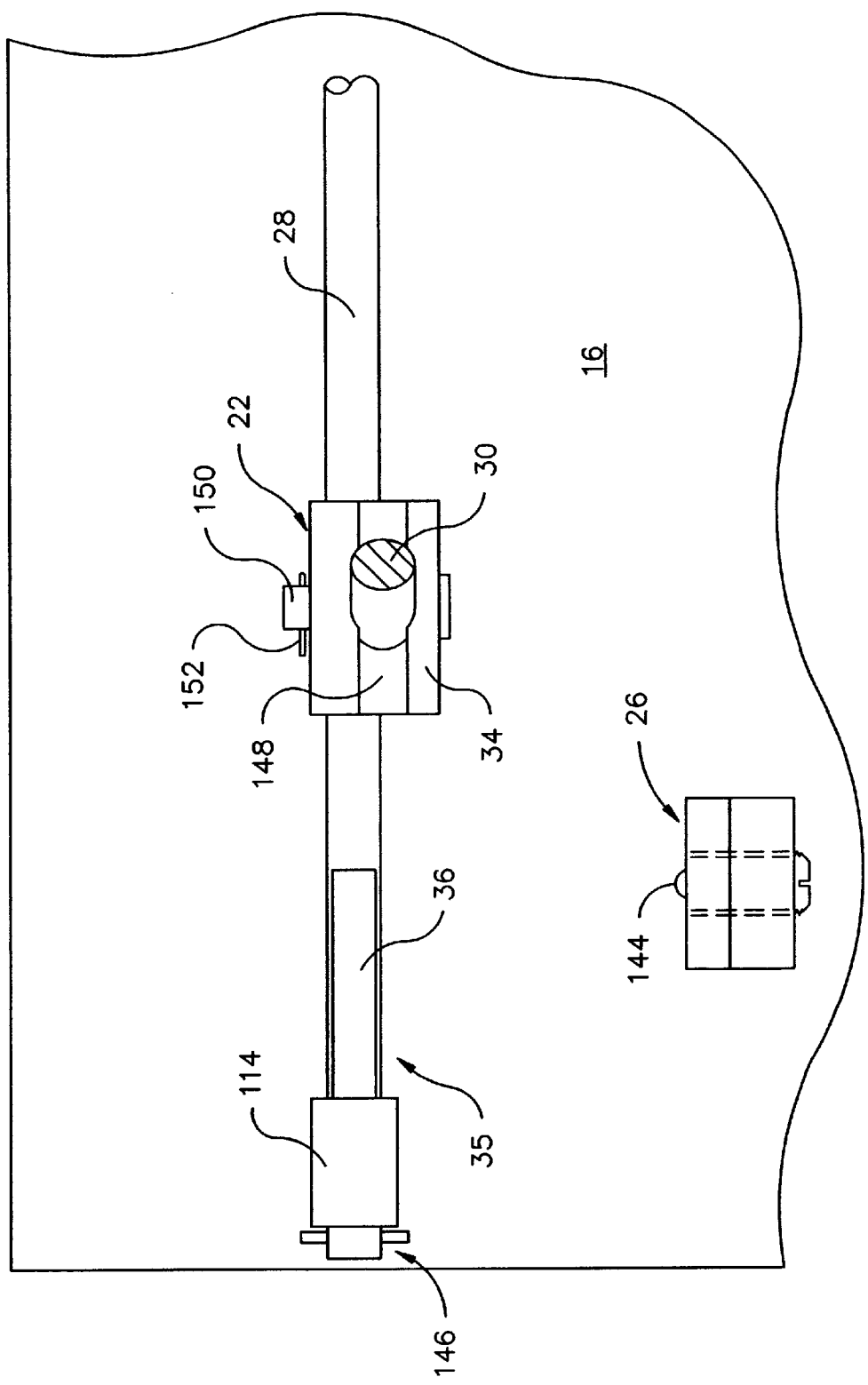

HAND TRUCK CONVERTIBLE TO A CART

BACKGROUND OF THE INVENTION

The present invention relates to a hand truck and, more specifically, to a hand truck that is convertible to a cart having an elevated tabletop type of surface.

Many devices have been developed over the years to aid people in the movement and transportation of items that otherwise would be too heavy or unwieldy to move. There exist a multitude of powered devices such as cranes, forklifts, hydraulic ramps, etc. that simplify moving. A similar variety of non-powered devices also exist for people to choose from. Non-powered devices, such as pulleys, ropes, clamps, levers, and hand trucks, are commonly available to consumers. The ease of use of the contemporary hand truck makes it an ideal tool for transporting heavy objects and has led to the common use of hand trucks by tremendous numbers of people.

The wide utilization of hand trucks has caused many manufacturers to research improvements in the design of the modern hand truck. Today, industrial quality hand trucks are produced that have a frame made of thicker members and tougher materials to simplify transporting appliances and other items that are too large for smaller sized hand trucks. Additionally, hand trucks have been developed that are convertible into a cart to simplify the carrying of some objects. One disadvantage of the contemporary hand trucks which are convertible to carts, is the lack of a shelf that can be attached to the hand truck and that can be positioned as a tabletop surface like those commonly found on serving carts. The tabletop surface would be used to carry smaller, possibly more fragile, items than those transported by a typical hand truck. In an attempt to solve this problem, some hand trucks that are convertible to carts have separate shelf units that can be attached to that hand truck to create such a tabletop type of surface. However, the separate shelf units can be burdensome to remember to include when transporting their associated hand trucks. When the transportation of the appropriate separate shelf units is forgotten, an extra trip back to the respective storage location of the separate shelf units is necessary before being able to use the hand truck as a cart having a tabletop type of surface.

The present invention overcomes many of the drawbacks of the contemporary art by providing a hand truck with a movably attached plate that is capable of forming an elevated tabletop surface when the hand truck is being used as a cart. This allows the inventive hand truck to be stored and operated in a fashion similar to that of contemporary hand trucks and eliminates the need for the storage and transportation of separate shelf units. The sturdy construction of the hand truck of the present invention allows the hand truck to be serviceable under variety of conditions. The inventive hand truck uses simple and durable mechanisms thereby reducing the frequency of repairs and, accordingly, reducing the length of time to effectuate repairs once a mechanical problem develops.

SUMMARY OF THE INVENTION

Briefly stated, the present invention is directed to a hand truck which is convertible into a cart having an elevated tabletop surface. The hand truck has a primary frame which includes a first pair of wheels rotatably mounted thereon. The hand truck has at least one additional wheel adapted to allow the hand truck to be used as a cart. The primary frame is generally parallel to a supporting surface while the hand truck is being used as a cart. The improvement to the hand truck includes a plate movably attached to the primary frame and movable between a first position, generally parallel to and containing the primary frame, and a second position, generally parallel to and spaced apart from the primary frame, forming the tabletop surface.

The present invention is also directed to a hand truck that is covertible to a cart. The hand truck includes a primary frame having a first pair of wheels rotatably mounted thereon. A secondary frame is pivotally attached to the primary frame and has at least one additional wheel rotatably mounted thereon. The secondary frame is movable between a hand truck position, generally parallel to the primary frame, and a cart position generally perpendicular to the primary frame. The secondary frame, while in the cart position, causes the at least one additional wheel, in combination with the first pair of wheels, to be cable of supporting the primary frame. A plate is movably attached to the primary frame and is adjustable between a first position, generally parallel to and contacting the primary frame, and a second position, generally parallel to and spaced apart from the primary frame.

BRIEF DESCRIPTION OF THE DRAWINGS

The foregoing summary, as well as the following detailed description of the preferred embodiment of the invention will be better understood when read in conjunction with the appended drawings. For the purpose of illustrating the invention, there is shown in the drawings, an embodiment which is presently preferred. It should be understood, however, that the present invention is not limited to the particular arragement and instrumentality shown. In the drawings:

FIG. 5 is a right side elevational view of the hand truck of FIG. 1 illustrating the secondary frame partially pivoted about the primary frame;

FIG. 10 is an enlarged cross-sectional view of the latch of FIG. 9 taken along the line 10—10 of FIG. 9 while the plate is in a first position;

FIG. 13 is a cross-sectional view similar to that of FIG. 10 illustrating the engagement between the latch of the plate and the crossbar of the secondary frame while the plate is in the second position;

FIG. 15a is an enlarged partial right side elevational view of the hand truck of FIG. 1 illustrating a block connection between one of a pair of arms (that are pivotally attached to the hand truck) and one of a pair of guide bars (that are attached to the plate);

FIG. 15b is a partial right side elevational view of the hand truck of FIG. 14 illustrating one of the blocks locked in position by a recess in one of the guide rails;

FIG. 16 is a partial bottom planar view of the plate of FIG. 15a taken along the line 16—16 of FIG. 15a;

FIG. 22 is a partial bottom planar view of the plate of FIG. 21a taken along the line 22—22 of FIG. 21a.

DETAILED DESCRIPTION OF THE INVENTION

Figure 1:
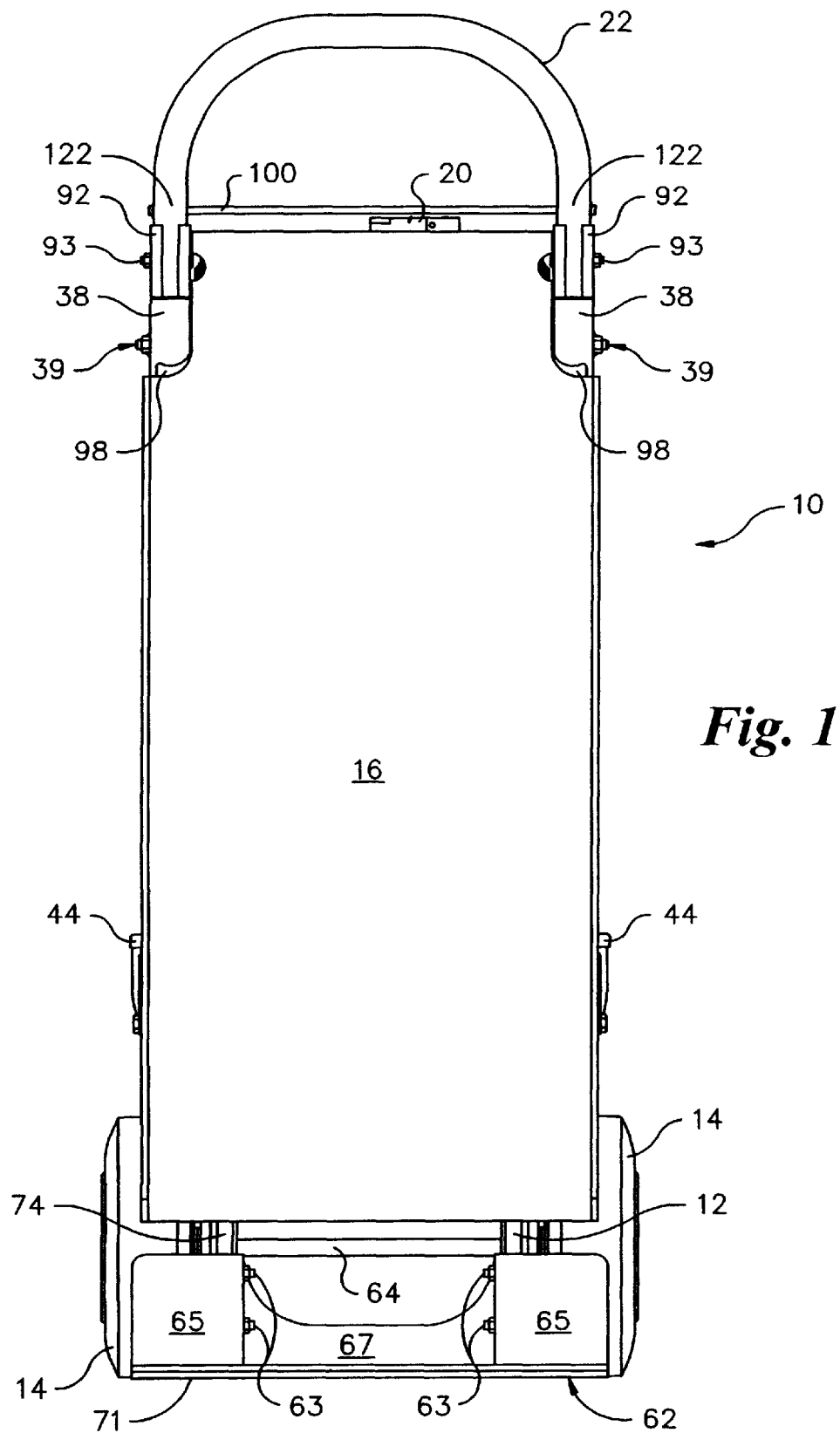
FIG. 1 is an elevational front view of a hand truck in accordance with the present invention.

Certain terminology is used in the following description for convenience only and is not limiting. The words "right," "left," "lower," and "upper" designate directions in the drawings to which reference is made. The words "inwardly" and "outwardly" refer to directions toward and away from, respectively, the geometric center of the hand truck and designated parts thereof. The terminology includes the words above specifically mentioned, derivatives thereof and words of similar import.

Figure 14:
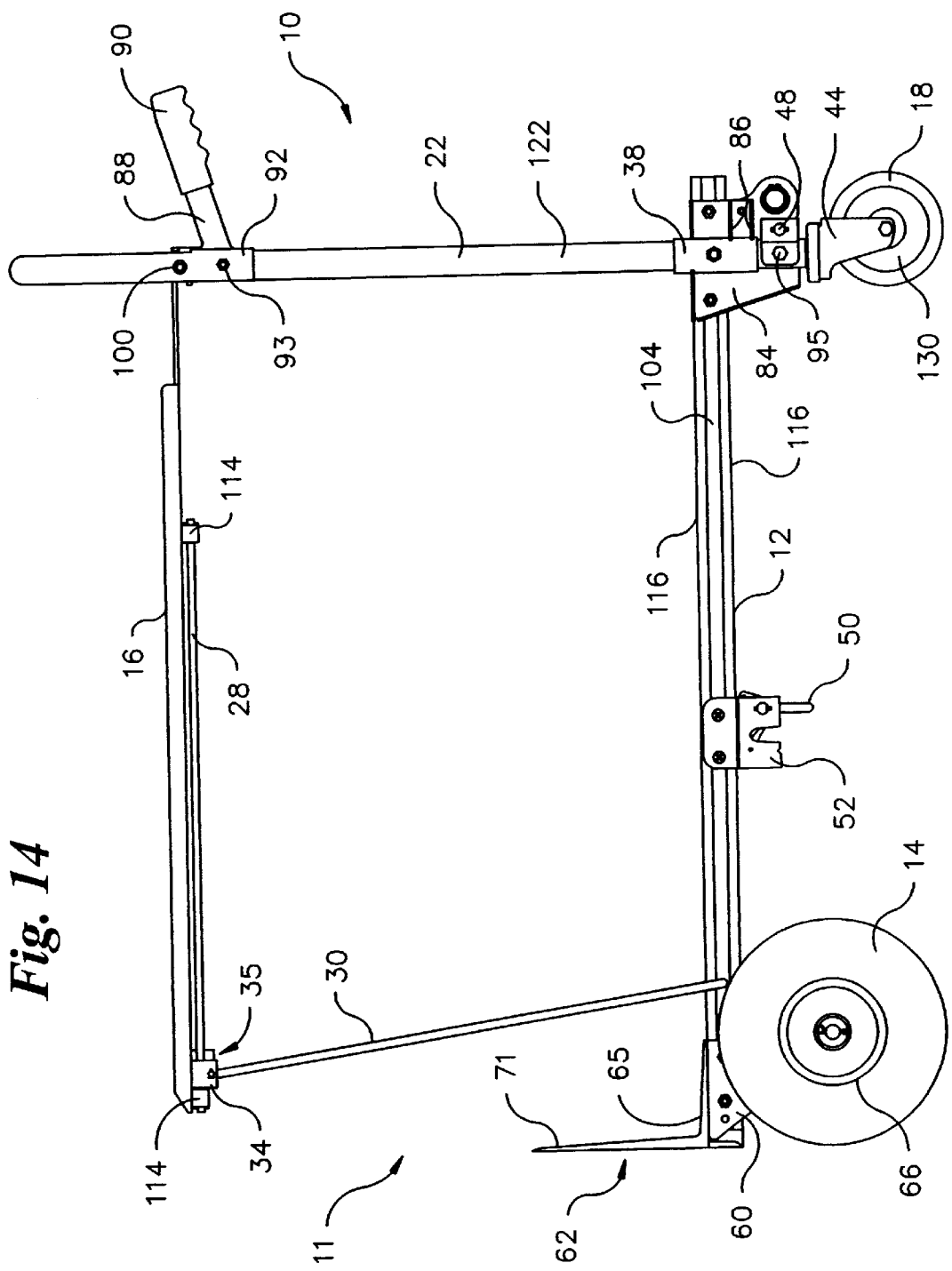
FIG. 14 is a right side elevational view of the hand truck of FIG. 1 in the cart position with the plate in the second position to form an elevated tabletop surface.

Referring, to the drawings in detail, wherein like numerals indicate like elements throughout, there is shown in FIGS. 1–24 a preferred embodiment of a hand truck, generally designated 10. Generally speaking, the hand truck 10 is convertible into a cart having an elevated tabletop surface as shown in FIG. 14. The hand truck 10 has a primary frame 12 which includes a first pair of wheels 14 rotatably mounted thereon. The hand truck 10 has at least one additional wheel 18, and preferably a second pair of wheels 18, adapted to allow the hand truck 10 to be used as a cart 11. The primary frame 12 is generally parallel to a supporting surface while the hand truck 10 is being used as a cart 11 as shown in FIGS. 7, 11, 12, and 14. The elevated tabletop surface includes a plate 16 movably attached to the primary frame 12 and movable between a first position (shown in FIG. 7), generally parallel to and contacting the primary frame 12, and a second position (shown in FIG. 14), generally parallel to and spaced apart from the primary frame 12, forming the tabletop surface.

Figure 9:
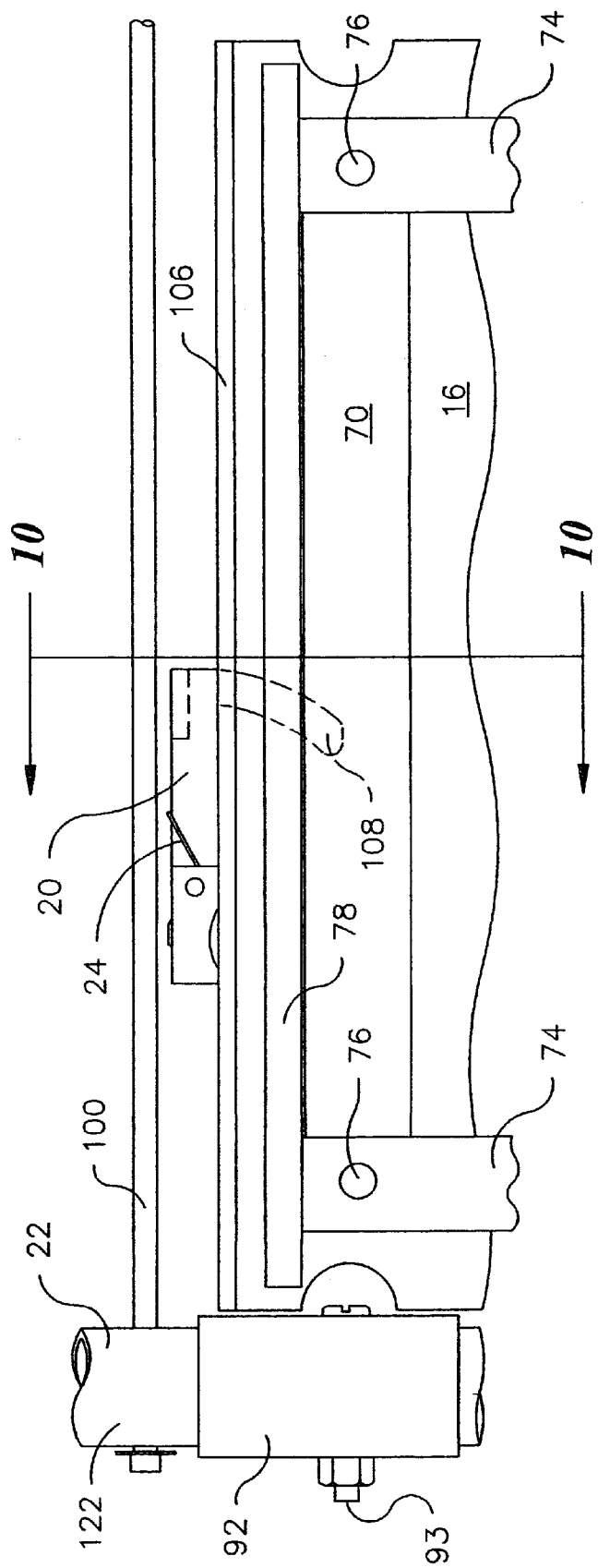
FIG. 9 is an enlarged partial rear elevational view of the hand truck of FIG. 1 illustrating a latch securing the top of the plate to the primary frame.
Figure 19:
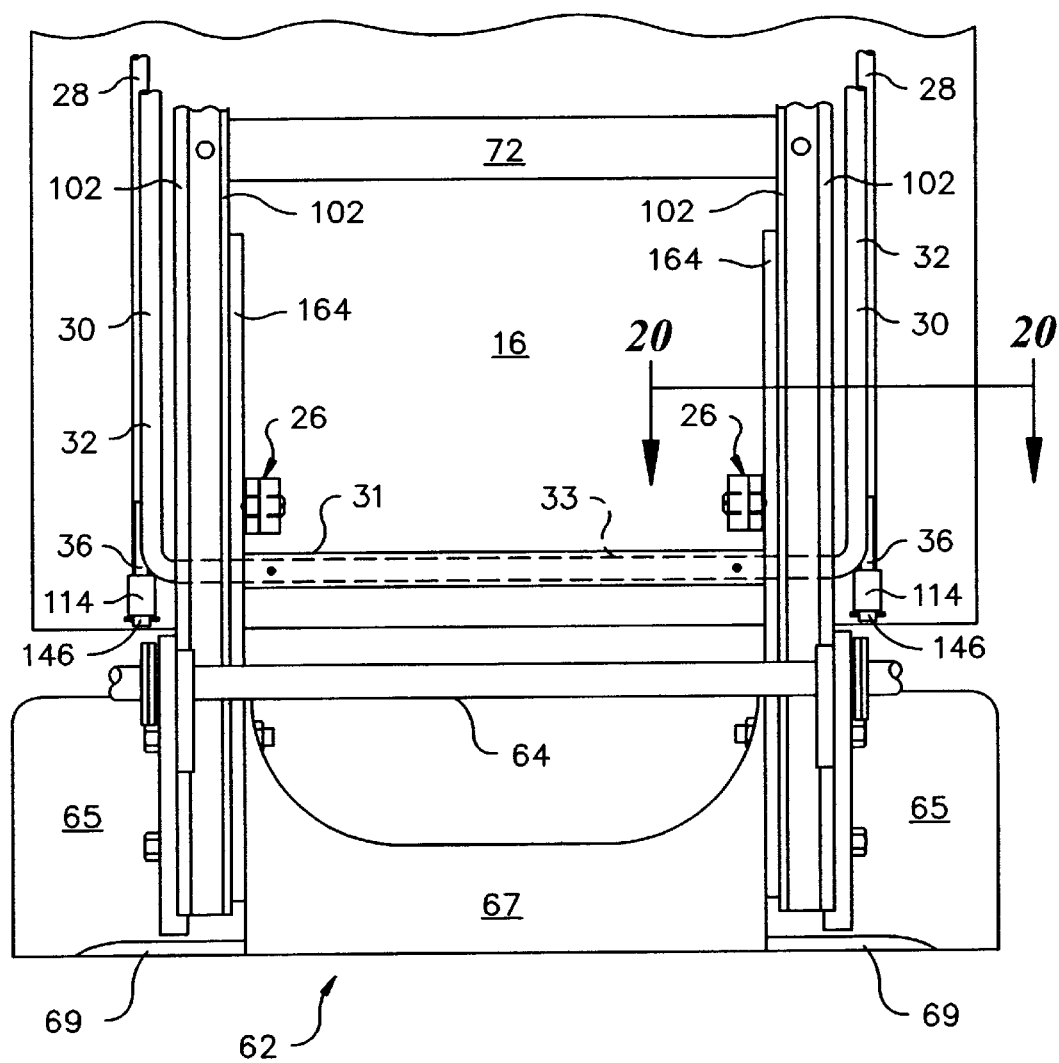
FIG. 19 is a view similar to that of FIG. 17 illustrating an alternate method of securing the bottom of the plate in the first position using a pair of detent mechanisms.

In FIG. 1 the pair of wheels 14 are shown in the lower left and right corners of the drawing. Referring to FIGS. 1, 3, 9, and 19, the preferred embodiment of the present invention is preferably formed with the primary frame 12 having two vertical struts 74. The two vertical struts 74 are joined by a first crossbar 70 that is disposed proximate to the upper end of the two vertical struts 74 as shown in FIGS. 9, 10, and 13. A second crossbar 72 also connects the two vertical struts 74 at a point slightly below the midpoint of the two vertical struts 74 as shown in FIGS. 17 and 19.

In the preferred embodiment, the first and second crossbars 70, 72 are formed using rectangular tubes of material. The first and second crossbars 70, 72 can also be formed using round tubing, polygonal tubing or simple plates or strips of maternal. While in the preferred embodiment there are two crossbars 70, 72 between the vertical struts 74, it is understood by those of ordinary skill in the art from this disclosure that the present invention is not limited to any particular number of crossbars. For instance, one, three or four equally spaced crossbars can be used to connect the two vertical struts 74.

Unless otherwise stated herein, the non-fastening elements of the primary frame 12 and a secondary frame 22 (further detailed below) are constructed of a high strength, light weight material such as aluminum. However, it is understood by those of ordinary skill in the art from this disclosure that other materials, such as steel, stainless steel, or high density plastic, can be used without departing from the spirit and the scope of the invention.

Figure 3:
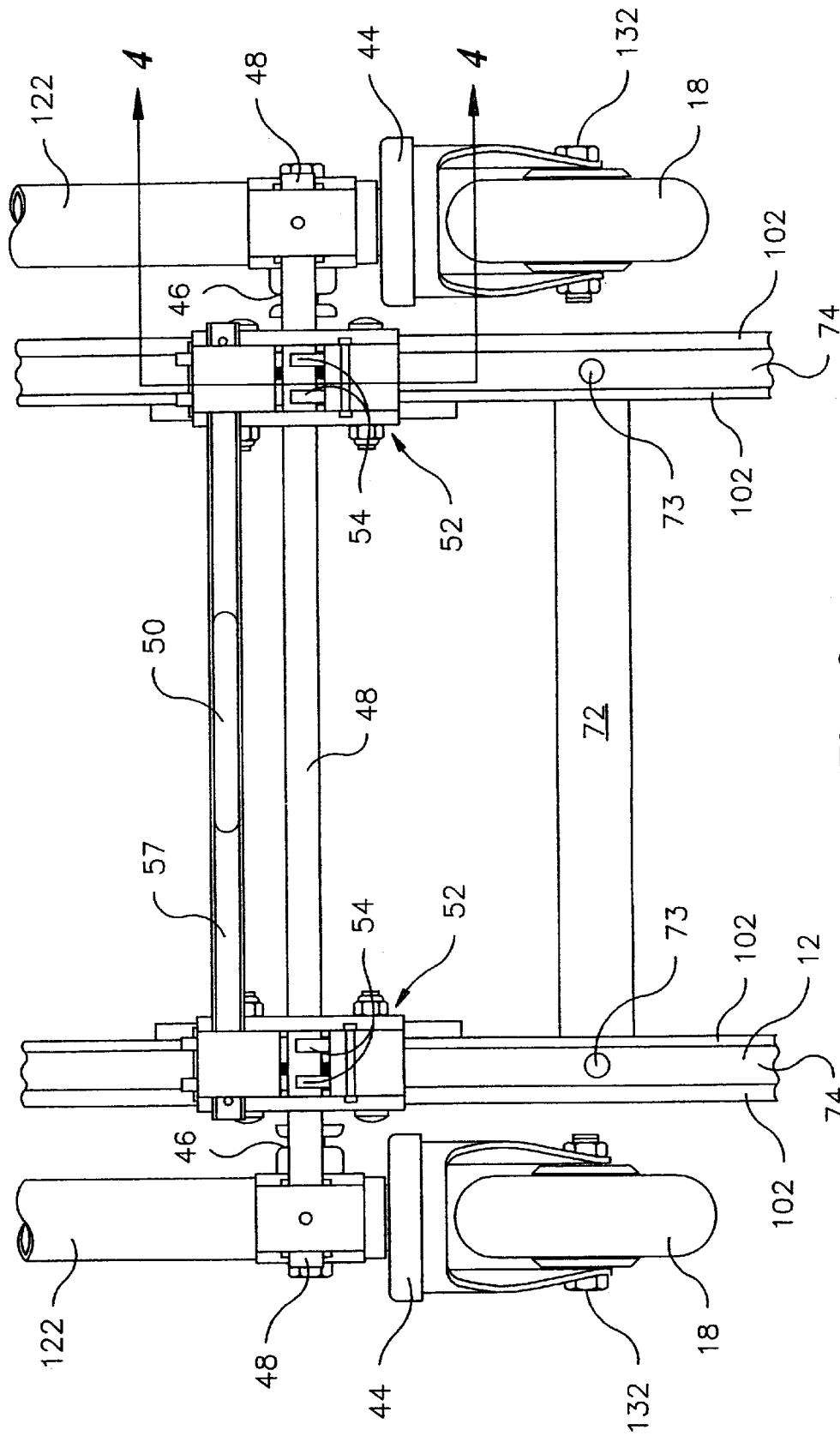
FIG. 3 is an enlarged partial rear elevational view of the hand truck of FIG. 2 taken along the lines 3—3 of FIG. 2.
Figure 17:
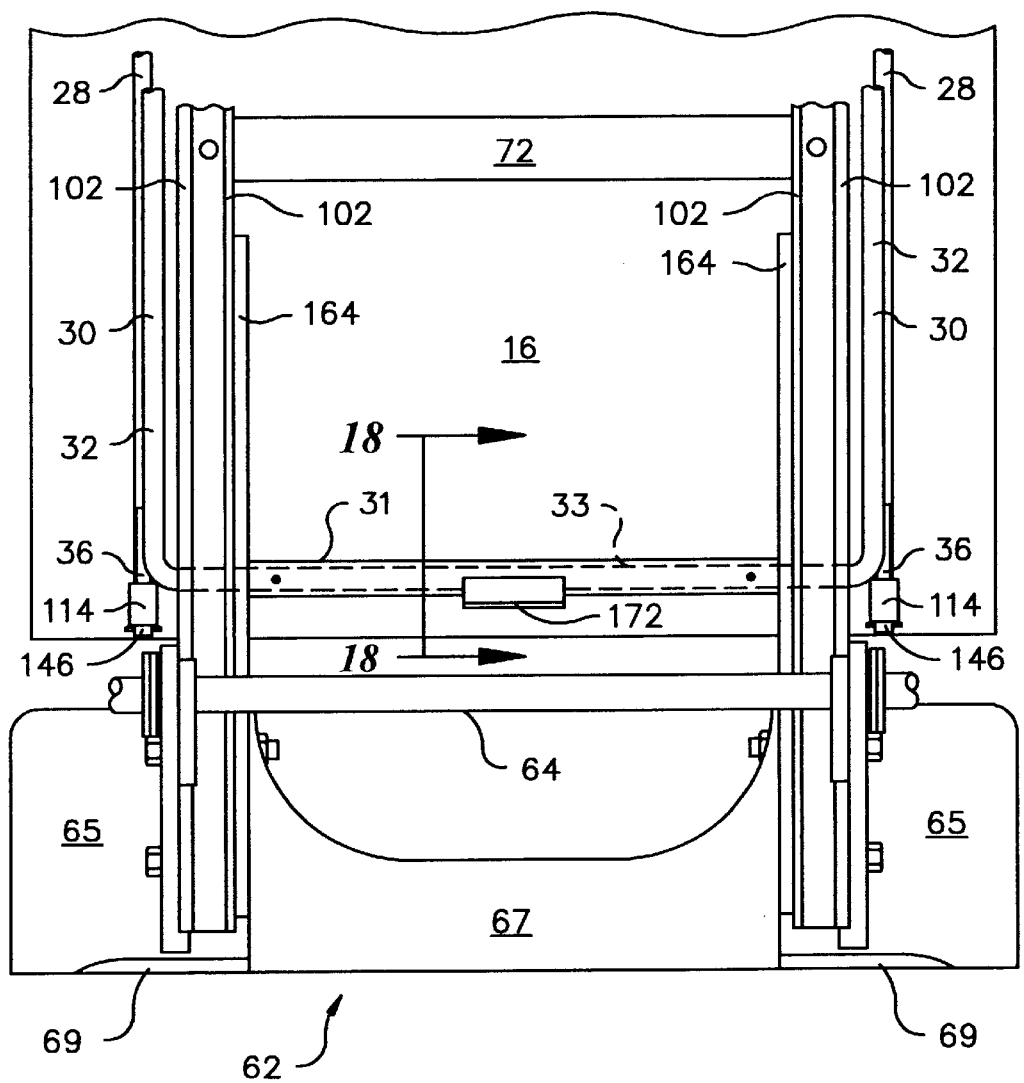
FIG. 17 is a broken away rear elevational view of the hand truck of FIG. 2 taken along the line 17—17 of FIG. 2 illustrating the preferred method of securing the bottom of the plate in the first position using a S-shaped grip.

As shown in FIGS. 3, 17 and 19, each vertical strut 74 has a raised portion 102 along the left and right edges on the front side (not shown) and on the rear side. These raised portions 102 result from the type of beam (i.e., an I beam) used to form the vertical struts 74. In addition, as shown in FIGS. 6, 7, 11, 12, and 14, each vertical strut 74 has a channel 104 with a flange section 116 on both the top and bottom sides of the channel 104. While this configuration is due to the particular beams chosen to construct the vertical struts 74 of the preferred embodiment, it is understood by those of skill in the art from this disclosure that the present invention is not limited to the type of beams shown in the drawings to construct the vertical struts 74. For instance, different types of I beams, T beams, rectangular tubing, and circular tubing can also be used to form the vertical struts 74.

As shown in FIGS. 3 and 9, in the preferred embodiment of the present invention the first crossbar 70 and the second crossbar 72 are secured using fasteners 76, 73 that fasten each of the left and right sides of the first and second crossbars 70, 72 to the vertical struts 74. Thus secured, the first and second crossbars 70, 72 (in combination with the plate 16) allow the primary frame 12 to support one side of an object (not shown) that is carried on the hand truck 10.

Unless otherwise stated herein, the fasteners of the hand truck 10 are preferably formed of bolt and nut pairs. However, those of skill in the art will appreciate from this disclosure that the fasteners can be any combination of rivets, screws, snap-fit connections, or welds without departing from the scope of the present invention. Additionally, it is preferred that the bolt and nut pairs are formed of a high strength, light weight material such as aluminum. However, it is understood by those of ordinary skill in the art from this disclosure that other materials, such as steel, stainless steel, high density plastic, or other materials can be used without departing from the scope of the invention.

Figure 2:
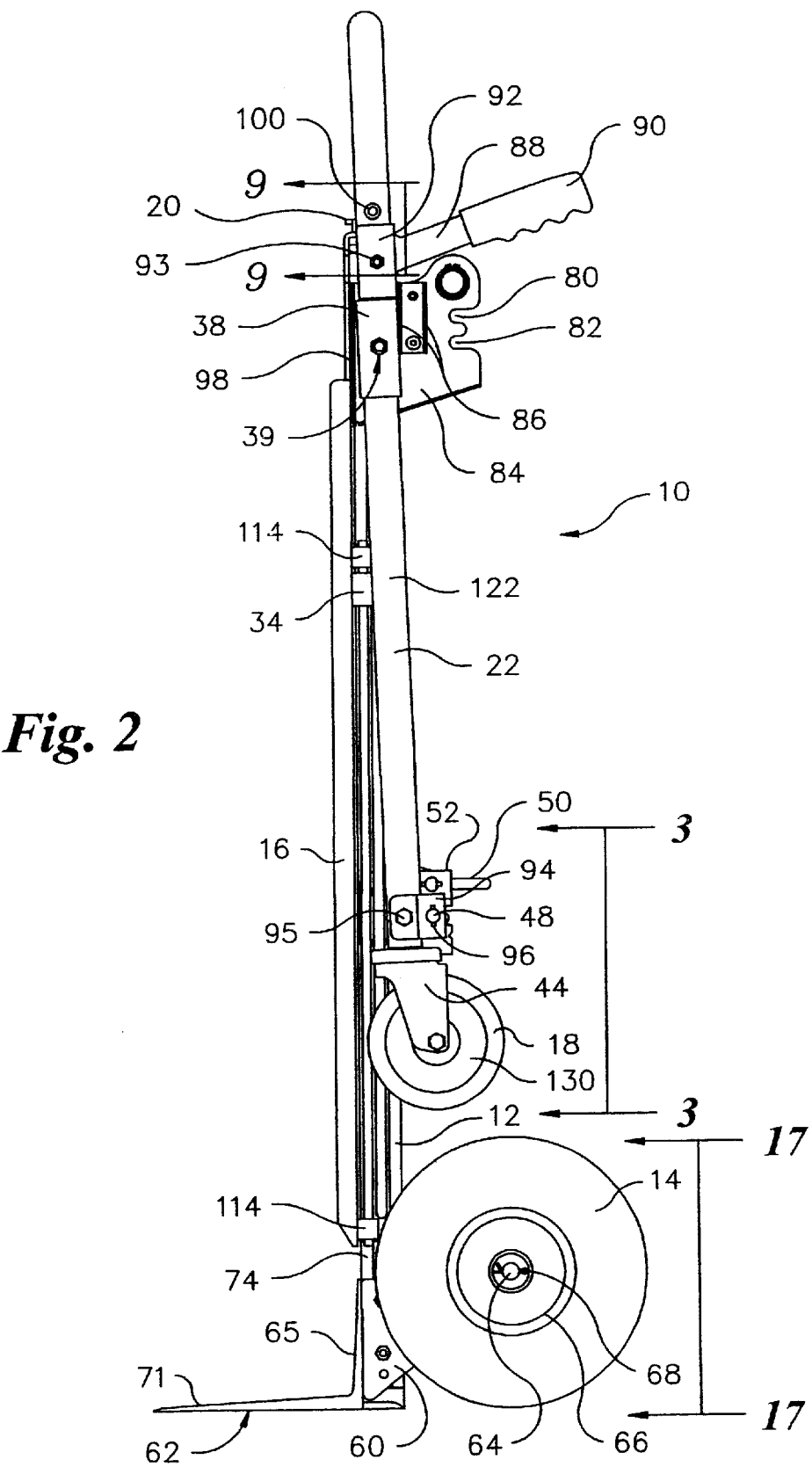
FIG. 2 is a right side elevational view of the hand truck of FIG. 1 with a secondary frame in the hand truck position.

The wheels 14 are located on the lower end of the primary frame 12 on the right and left sides of the primary frame 12, and are used to bear the weight of items that are carried using the hand truck 10. The wheels 14 are constructed in a conventional manner as is well understood by those of skill in art. As shown in FIGS. 2 and 5, each of the wheels 14 is rotatably attached to a flange 60 which extends rearwardly from the outer side of the vertical struts 74. The wheels 14 are attached to an end of an axle 64 using a cotter pin 68. As shown in FIGS. 2, 5–7, 11, 12, and 14, the wheels 14 are each mounted on a rim 66.

In the preferred embodiment of the present invention, the rims 66 are formed using a material that is highly corrosive resistant, strong, and durable, such as aluminum. However, those of skill in the art will appreciate from this disclosure that the rims 66 can be formed of a variety of suitable materials that are known to those of skill in the art. The use of flanges 60 to support the wheels 14 allows the nose-piece 62 to have a wider width than would be possible if the pair of wheels 14 were attached at the lower end of the primary frame 12. Of course, if the pair of wheels 14 were mounted on the lower end of the frame 14 without using the flanges 60, then the nose-piece 62 would have a shorter width as measured from the lower left-side to the lower right side in FIG. 1, without affecting the proper operation of the present invention.

In the preferred embodiment of the present invention, each flange 60 is generally in the form of a semi-trapezoid. However, the particular dimensions, or shapes, of the flanges 60 is not crucial to the present invention. In the preferred embodiment of the present invention, the flanges 60 are attached to the outside of the vertical struts 74 along the lower portion of the vertical struts 74 using standard fasteners 61. While in the preferred embodiment of the present invention the flanges 60 are attached to the bottom end of the vertical struts 74, the flanges 60 can be placed higher up along the vertical struts 74 than the positioning shown in FIGS. 2, 5–7, 11, 12, and 14 depending on the size of the wheels 14 used with the primary frame 12.

Referring to FIGS. 2 and 5, the primary frame 12 includes a nose piece 62 which is used for transporting heavy loads using the hand truck 10. Referring to FIGS. 1, 17 and 19, the nose piece 62 is preferably formed or cast as a single piece. The nose piece 62 preferably includes a blade portion 71, two side panels 65 (which are positioned on the front of the vertical struts 74), fastening panels (not shown), a rear panel 67, and reinforcing sections 69.

Referring to FIG. 1, the side panels 65 are preferably positioned on the front of the vertical struts 74 and the rear panel is generally aligned with the rear side of the vertical struts 74. The side panels 65 and the rear panel 67 are preferably generally parallel to each other and are connected by fastening panels. The fastening panels are preferably positioned along the inner surface of the vertical struts 74 and are attached thereto via fasteners 63. Essentially the fastening panels and the rear panel 67 combine to form a rectangular box-like projection that is inserted between the two vertical struts 74.

Referring to FIGS. 17 and 19, reinforcing sections 69 are preferably positioned proximate to the edge along which the side panels 65 and the blade portion meet. While it is preferable that the nose piece 62 is integrally formed, those of skill in the art will appreciate from this disclosure that the nose piece 62 can be formed using discrete parts that are either fastened or welded together without departing from the scope of the present invention.

The blade portion 71 of the nose piece 62 extends away from the primary frame 12 and preferably forms an angle of approximately 90 degrees with the primary frame. However, those of skill in the art will appreciate from this disclosure that the particular angle between the blade portion 71 of the nose piece 62 and the primary frame 12 can be varied without departing from the scope of the present invention.

While the preferred embodiment of the nose piece 62 is fastenably secured to the vertical struts 74, those of skill in the art will appreciate from this disclosure that the nose piece 62 can be integrally formed or casted with the primary frame 12 or that the nose piece 62 can be welded to the primary fame 12 in a manner known to those of skill in the art. Those of skill in the art will appreciate from this disclosure that the above-described structure of the nose piece 62 can be varied without departing from the scope of the present invention.

A secondary frame 22 is pivotally attached to the primary frame 12 and has at least one additional wheel 18 rotatably mounted thereon. Referring to FIG. 1, the secondary frame 22 preferably has a U-shaped structure. Referring to FIGS. 1, 2, 5–7, 11, 12, and 14, the secondary frame 22 has legs 122 which extend downwardly. Each of the legs 122 is pivotally attached to the primary frame 12 via a collar 38. The collars 38 are each preferably located proximate to one of the left and right upper sides of the primary frame 12.

Figure 8:
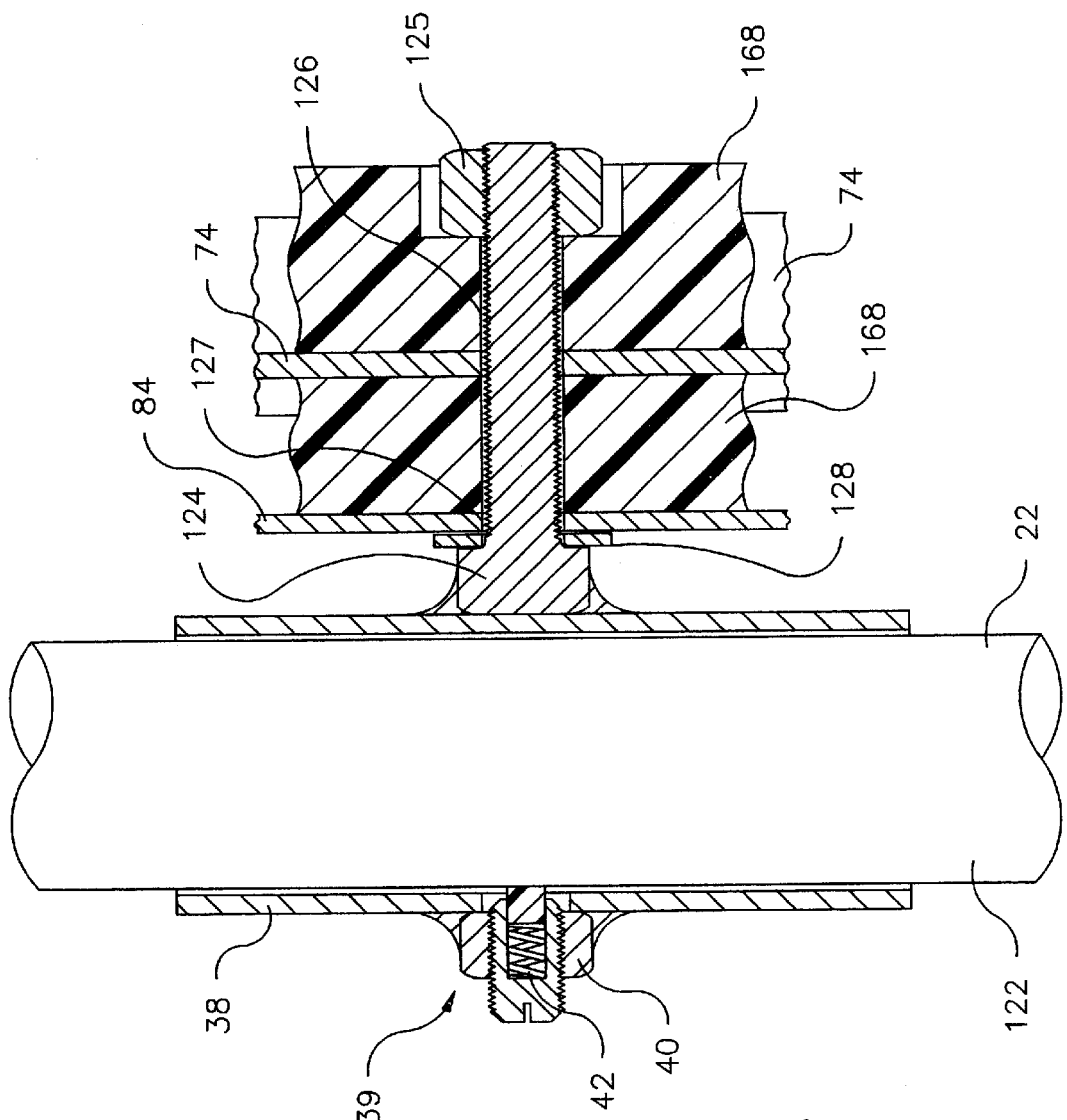
FIG. 8 is a greatly enlarged cross-sectional view of the hand truck of FIG. 6, taken along the line 8—8 of FIG. 6, illustrating a collar that pivotally secures a leg of the secondary frame to the primary frame and showing a speed reducing mechanism housed in the collar.

Referring to FIG. 8, the collars 38 are each attached to a shaft 124 which extends laterally through a corresponding vertical strut 74 and is secured by a fastener 125. The shaft 124 extends through a bore 126 in the vertical strut 74 (the bore 126 is in the portion of the vertical strut 74 that forms the stem of the I-beam and that is shown in cross-section) and protrudes past the outer surface of the vertical strut 74 to support the collar 38 at a predetermined distance from the vertical strut 74. The bore 126 and the shaft 124 are preferably generally perpendicular to the longitudinal axis of the respective vertical strut 74.

On both sides of the stem portion of the vertical strut 74 is a plastic, or polymeric, element 168. The plastic element, or spacer, 168 on the left side of the stem of the vertical strut 74 is interposed between the stem portion of the vertical strut 74 and the upper flange 84. The shaft 124 extends through both plastic elements 168, the vertical strut 74 and the upper flange 84. The portion of the shaft 124 that extends leftward from the upper flange 84 toward the collar 38 is larger in diameter than the bore 127. This difference in diameters, in combination with the fastener 125, secures the shaft 124 to the vertical strut 74. Preferably, a metallic washer 128 is disposed between the larger portion of the shaft 124 which protrudes past the outer surface of the upper flange 84 and the outer surface of the plastic element 168 attached to the right side of the stem of the vertical strut 74.

Though the washer 128 is preferably formed of a metallic material, those of skill in the art will appreciate from this disclosure that other materials can be used to form the washer 128 without departng from the scope of the present invention. Additionally, while it is preferred that elements 168 are formed using a plastic material, those of skill in the art will understand from this disclosure that the type of material used to form elements 168 is not critical to the present invention.

While the shaft 124 is preferably welded to the collar 38, those of skill in the art will appreciate from this disclosure that the collar 38 and the shaft 124 can be integrally molded or cast. Thus, once the collar 38 is attached to the vertical strut 74 via the shaft 124, the collar 38 can pivotally rotate about the axis of the shaft 124. This allows the secondary member 22 to rotate with respect to the primary frame 12 and to slide through the collars 38.

The second pair of wheels 18 are each preferably attached to the end of a leg 122 of the secondary frame 22 via rotating mounts 44. Referring to FIG. 2, the second pair of wheels 18 are generally aligned with the sides of the primary frame 12 while the hand truck 10 is configured to be used as a typical hand truck. While the preferred embodiment of the hand truck 10 has a pair of wheels 18 attached to the secondary frame 22, those of skill in the art will appreciate from this disclosure that the secondary frame 22 can have only one wheel 18 attached at a location generally centrally aligned between the two wheels 14 of the primary frame 12 without departing from the scope of the present invention.

Referring to FIGS. 1, 2, 5–7, and 9–14, the secondary frame 22 has a crossbar 100 (described further below) disposed proximate to the U-shaped portion of the secondary frame 22 and extending between the two legs 122. Additionally, the secondary frame 22 includes handles 88 as shown in FIGS. 2, 5–7, and 11–14. The handles 88 are attached to each leg 122 of the secondary frame 22 via a handle securing clasp 92 which is secured to the secondary frame 22 by a fastener 93. The handles 88 extend rearwardly and slightly upwardly from the secondary frame 22 and each supports a grip 90 on an end opposite from the secondary frame 22. The grip 90 is preferably formed of a rubber or thermoplastic material that simplifies the handling of the hand truck 10. While the preferred embodiment of the hand truck uses clasps 92 to connect the handles 88 to the secondary frame 22, those of skill in the art will appreciate from this disclosure that the handles 88 can be integrally formed or casted with the secondary frame 22. Additionally, while it is preferable to have a grip portion 90 formed of a material, such as rubber or a suitable thermoplastic material, those of skill in the art will appreciate from this disclosure that the grip 90 is not pertinent to the present invention and, accordingly, is not further detailed herein.

While the secondary frame 22 preferably has a U-shape as shown in FIG. 1, those of skill in the art will appreciate that the shape of the secondary frame 22 is not pertinent to the present invention. The only important aspect of the shape of the secondary frame 22, is that the secondary frame 22 is pivotable about the primary frame 12 and slidable through the pivot point.

The secondary frame 22 is movable between a hand truck position (shown in FIGS. 1–3), generally parallel to the primary frame 12, and a cart position (shown in FIGS. 7, 11, 12, and 14) generally perpendicular to the primary frame 12. Referring to FIG. 5, the secondary frame 22 is rotated from the hand truck position to the cart position by rotating the secondary frame 22 counterclockwise as shown by the arrow denoted "A." The secondary frame 22 pivots with respect to the primary frame 12 by pivoting about the rotational axis of the collars 38. When the secondary frame 22 is in the hand truck position (as shown in FIG. 2), the legs 122 protrude downwardly through the collars 38 causing the clasp 92 of the handle 88 to abut the top side of the collars 38. Referring to FIGS. 7, 11, 12 and 14, when the secondary frame 22 is in the cart position, the legs 122 of the secondary frame 22 extend upward from the collars 38 causing the side plates 94 (further detailed below) to abut the bottom ends of the collars 38.

When the U-shaped secondary frame 22 is in the hand truck position, as shown in FIGS. 1–3, the legs 122 of the secondary frame 22 abut a hand truck stop plate 98. One hand truck stop plate 98 is preferably located proximate to each of the left and right upper corners of the primary frame 12. While in the preferred embodiment the hand truck stop plates 98 are connected to the vertical struts 74 using fasteners (not shown), it is understood by those of ordinary skill in the art from this disclosure that the present invention is not limited to any particular method of attaching the hand truck stop plates 98 to the vertical struts 74. As mentioned above, the legs 122 of the secondary frame 22 rotate about the shaft 124 of the collars 38. One shaft 124 is located proximate to each hand truck stop plate 98 on the vertical struts 74.

Referring to FIGS. 2, 5–7, 11, 12 and 14, one upper flange 84 is located on the outside of each of the vertical struts 74. Cart stop plates 86 are located on the outside of each upper flange 84. The cart stop plates 86 prevent the secondary frame 22 from rotating counterclockwise past the point where the secondary frame 22 is perpendicular with the primary frame 12.

Once the U-shaped secondary frame 22 is in the hand truck position, a cart axle 48 is locked in place by a cam locking device 52. The cart axle 48 extends between the legs 122 of the secondary frame 22 to allow the upper flange 84 to secure the secondary frame 22 at two locations (further detailed below). Side plates 94 are attached to the outer surface of each leg 122 proximate to the rotating mount 44 to support the cart axle 48. The side plates 94 are attached to the legs 122 of the secondary frame 22 via fasteners 95.

While the cart axle 48 is preferably mounted to the secondary frame 22 using side plates 94, those of skill in the art will appreciate from this disclosure that the cart axle 48 can be directly attached to the legs 122 and can be integrally formed with the secondary frame 22. The use of side plates 94 which extend rearwardly from the legs 122 offsets the position of the axle 48 to allow the upper flange 84 to secure the secondary frame 22 at two points (i.e., at locations proximate to the legs 122, and along the cart axle 48 as detailed below). However, those of skill in the art will appreciate from this disclosure that depending upon the shape of the legs 122 proximate to the rotating mounts 44, that it is possible for the upper flange 84 to secure the secondary frame 22 at two locations without the use of side plates 94.

Figure 4A:
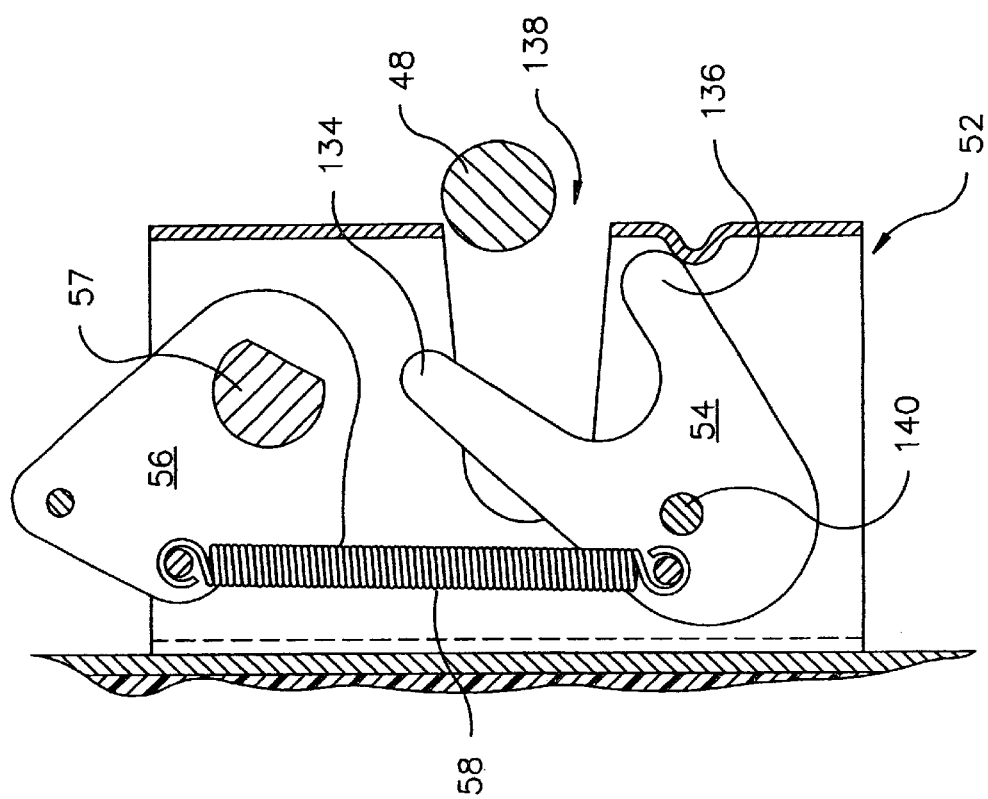
FIG. 4a is an enlarged cross-sectional view of a cam locking device of FIG. 3 taken along the lines 4—4 of FIG. 3 illustrating the cam locking device securing a crossbar of the secondary frame to secure the secondary frame in the hand truck position.
Figure 4B:
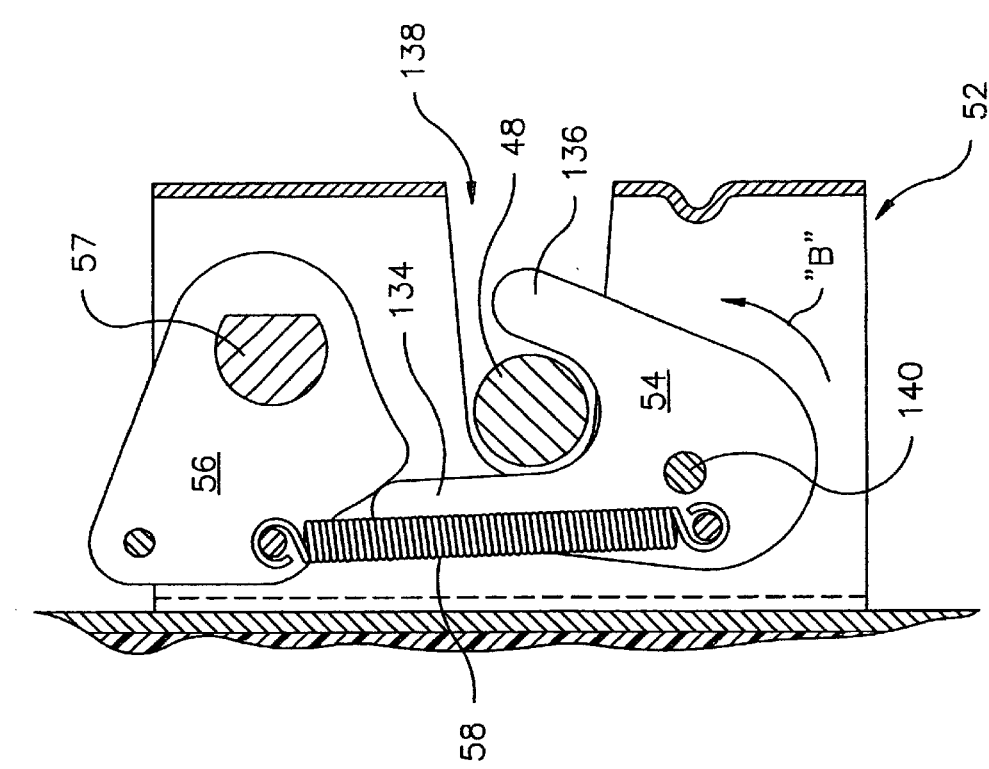
FIG. 4b is an enlarged cross-sectional view of the cam locking device of FIG. 3 taken along the lines 4—4 of FIG. 3 illustrating the cam locking device disengaged from the crossbar of the secondary frame allowing the secondary frame to pivot about a primary frame.

Referring to FIGS. 3, 4a, and 4b, the secondary frame 22 is secured in the hand truck position by the cam locking device 52. The cart axle 48 is secured by the cam locking device 52 due to the engagement of bar securing rockers 54 with the cart axle 48. Referring to FIG. 3, it is preferable that a cam locking device 52 be disposed on the rear side of each vertical strut 74. However, those of skill in the art will appreciate from this disclosure that the present invention is not limited to a hand truck having two cam locking devicess 52. For example, a single cam locking device 52 can be centrally disposed on a crossbar and used to secure the cart axle 48 (not shown).

Each cam locking device 52 preferably has two bar securing rockers 54 which engage the cart axle 48. The bar securing rocker 54 is pivotally attached to the cam locking device 52 via a pin 140. However, those of skill in the art will appreciate from this disclosure that any number of bar securing rockers 54 can be used. For example, each cam locking device 52 may incorporate only one bar securing rocker 54 or may incorporate three or more bar securing rockers 54 (not shown).

Referring to FIG. 4a, the position of each bar securing rocker 54 is controlled by a corresponding cam 56 that is mounted on a cam axle 57. An elastic member 58, in the form of a coil spring, connects each cam 56 and bar securing rocker 54 pair. The shape of the cam 56, the shape of a first leg 134 of the bar securing rocker 54, and the elastic member 58 combine to cause the bar securing rocker 54 to rotate in a counterclockwise direction as shown by the arrow denoted "B" in FIG. 4a. This causes the second leg 136 of the bar securing rocker 54 to also rotate in a counterclockwise direction and causes the second leg 136 to secure the cart axle 48 within the groove 138 in the cam locking device 52. Referring to FIG. 3, the cam axle 57 extends between the cam locking devices 52 on the vertical struts 74 and is engaged with each cam 56 contained therein.

To release the secondary frame 22, the cam lock release handle 50 is rotated downwardly to cause the first leg 134 to move clockwise out of abutment with cam 56 and thereby rotates the second leg 136 of the bar securing rocker 54 clockwise to allow the cart axle 48 to exit the groove 138 in the cam locking device 52. The cam lock release handle 50 is preferably attached to the cam axle 57 which transfers any torque exerted on the cam lock release handle 50 to the cams 56.

Figure 6:
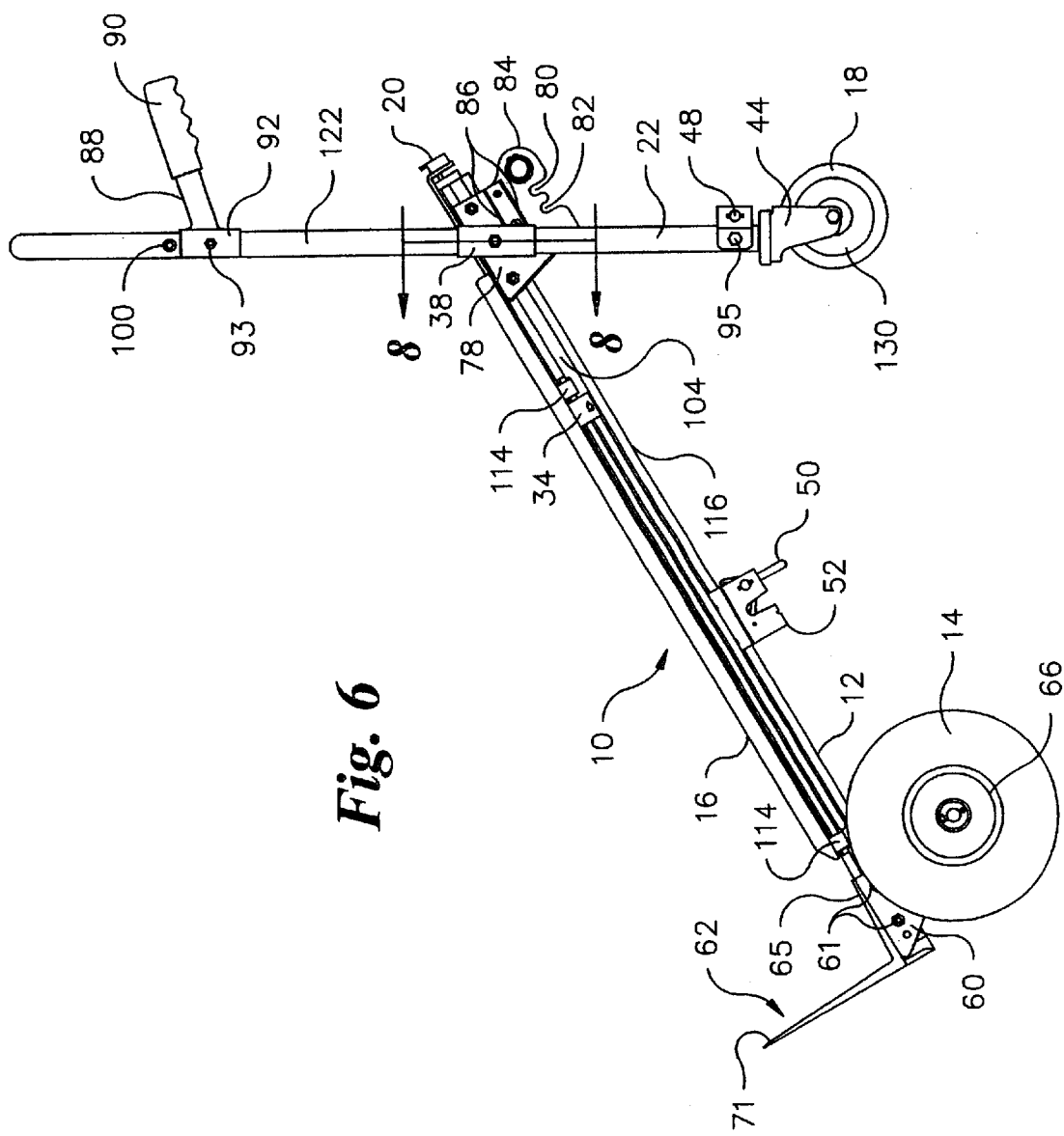
FIG. 6 is a right side elevational view of the hand truck of FIG. 1 partially converted to a cart.

Accordingly, once the cam lock release handle 50 is rotated clockwise, as viewed in FIG. 2, the cam locking device 52 releases the cart axle 48 and the secondary frame 22 is free to rotate counterclockwise, as viewed in FIGS. 5 and 6. The cart axle 48 is secured to the secondary frame 22 using the above-mentioned side plates 94. The cart axle 48 is inserted through each of the side plates 94 and is secured in place by a pin 96. As shown in FIG. 3, the lower end of each leg 122 of the secondary frame 22 has a catch 46 attached to an inwardly facing side of the leg 122. The catch 46 is knob-shaped and has a circumferential groove that allows a catch receiving groove 82 in the upper flange 84 to engage the catch 46.

After releasing the secondary frame 22 from the hand truck position and rotating the secondary frame 22 into a position perpendicular with the primary frame 12, the secondary frame 22 can slide through the collars 38 to allow the wheels 18 (located at the ends of the legs 122) to be brought toward the primary frame 12. As the additional wheels 18 are brought toward the primary frame 12 (as shown in FIG. 6), the cart axle 48 engages the axle securing groove 80 in the upper flange 84. Referring to FIG. 2, the axle securing groove 80 is positioned in the right side of the upper flange 84 above the catch securing groove 82.

The size and spacing of the axle securing groove 80 and the catch securing groove 82 correspond to the relative positions of the catch 46 (located on one leg 122) and the cart axle 48. Thus, the distance between the cart axle 48 and the catch 46 (as measured into the page in FIG. 3) corresponds to distance between the axle securing groove 80 and the catch securing groove 82 in the upper flange 84. Thus, when sliding the secondary frame 22 through the collars 38 (while the secondary frame 22 is positioned generally perpendicular to the primary frame 12), the catch 46 on each of the legs 122 engages the appropriate catch securing groove 82 and, at the same time, the cart axle 48 engages the axle securing grooves 80. Once both the catches 46 and the cart axle 48 have engaged the upper flanges 84, the hand truck 10 will remain stably in the cart position as long as all the wheels 14, 18 are in contact with the ground, as shown in FIGS. 7, 11, 12, and 14.

To convert the hand truck 10 from the cart position (shown in FIGS. 7, 11, 12, and 14) back to the hand truck position (shown in FIGS. 1–3), the hand truck 10 is positioned so that the primary frame 12 is generally perpendicular to the ground and so that the first pair of wheels 14 (which are attached to the lower end of the primary frame 12) are in contact with the ground. This places the hand truck 10 in a position similar to that shown in FIG. 5. Then, the secondary frame 22 is slid through the collars 38 (to the right as viewed in FIG. 5) to disengage the cart axle 48 and the catches 46 from the axle securing groove 80 and the catch securing groove 82, respectively. Afterwards, the secondary frame 22 can be rotated into a position substantially parallel with the primary frame 12 and the cart axle 48 can be secured by the cam locking device 52 as described above. Thus converted, the convertible hand truck 10 is now configured to operate as a normal hand truck.

The secondary frame 22, while in the cart position, causes the second pair of wheels 18, in combination with the first pair of wheels 14, to be capable of supporting the primary frame 12. Referring to FIGS. 7, 11, 12, and 14, when the hand truck 10 is converted into a cart 11, the first pair of wheels 14 and the at least one wheel 18 combine to vertically support the hand truck 10. While a preferred size ratio between the second pair of wheels 18 and the first pair of wheels 14 is shown, those of skill in the art will appreciate from this disclosure that the relative size of the first pair of wheels 14 and the second pair of wheels 18 depends, in large part, on the particular dimensions of the flanges 60 and the rotating mounts 44, respectively. Accordingly, the changes to the hand truck 10 that are necessary to accommodate the first and second pair of wheels 14, 18 having different sizes would be known to one of skill in the art when considered in combination with this disclosure.

The second pair of wheels 18, are each rotatable about the longitudinal axis of the associated supporting leg 122 of the secondary frame 22 due to the type of rotating mount 44 that connects the second pair of wheels 18 to the legs 122 as is known by those of skill in the art. The second pair of wheels 18 are mounted on an axle 132 which extends from one side of the rotating mount 44 to the other. Referring to FIGS. 2, 5–7, 11, 12, and 14, the second pair of wheels 18 are mounted on rims 130. The second pair of wheels 18 are of a type that is well understood by those of skill in the art and the rims 130 are similar to those of the first pair of wheels 14.

While it is preferred that the hand truck 10 have the above-described structure, those of skill in the art will appreciate from this disclosure that many of the specifics can be changed without departing from the scope of the present invention. The only important aspect of the specific structure discussed above is that the hand truck 10 is convertible to a cart 11 and that the hand truck 10 is able to accommodate a movably attached plate 16 (detailed below).

A plate 16 is movably attached to the primary frame 12 and is adjustable between a first position (as shown in FIGS. 1, 2, 5, and 7), generally parallel to and contacting the primary frame 12, and a second position (shown in FIG. 14), generally parallel to and spaced apart from the primary frame 12. The plate 16 is preferably formed of a durable, high strength, corrosion resistant material, such as aluminum. However, those of skill in the art will appreciate from this disclosure that other materials such as steel, stainless steel, high density plastic, alloys, or any other material possessing the necessary strength and anti-wear qualities can be used to form the plate 16. Additionally, while the plate 16 of the preferred embodiment does not have a liner, such as felt, rubber, carpeting or rug material on the top surface of the plate 16, those of skill in the art will appreciate that the plate 16 can include a liner without departing from the spirit and scope of the present invention.

Referring to FIGS. 9, 10 and 13, the plate 16 has a first lip 78 and a second lip 106 that each extend rearwardly from points proximate to the top side of the plate 16 (as viewed in FIG. 2). The first lip 78 preferably extends across substantially the entire width of the plate 16 and is positioned so that when the plate 16 is in the first position the first lip 78 is approximately aligned with the upper surface of the first crossbar 70, as shown in FIG. 9. The second lip 106 of the plate 16 extends rearwardly from the plate 16 and is both spaced a predetermined distance above the first lip 78 and is preferably generally parallel to the first lip 78. The spacing between the first lip 78 and the second lip 106 forms a groove 142.

In the preferred embodiment a latch 20 is positioned generally centrally along the width of the plate 16. However, those of skill in the art will appreciate that the position of the latch 20 along the plate 16 can be varied without departing from the scope of the invention. The latch 20 is interlocked with the primary frame 12 while the plate 16 is in the first position (as shown in FIGS. 9 and 10) and is interlocked with the secondary frame 22 while the plate 16 is in the second position (as shown in FIG. 13) and the secondary frame 22 is in the cart position (as shown in FIGS. 7, 11, 12, and 14) to secure the plate 16 in the first and second positions, respectively. Referring to FIGS. 9 and 10, while the secondary frame 22 is latched in the first position, a prong 108 extends from the latch 20 through a slot 110 in the second lip 106, through a slot 111 in the first lip 78, and through a slot 112 in the first crossbar 70 of the primary frame 12 to secure the plate 16 to the primary frame 12.

The latch 20 is biased into a locked position by an elastic member 24 as shown in FIGS. 9, 10, and 13. Referring to FIG. 10, the elastic member 24 is preferably a torsional spring that biases the latch 20 to prevent the prong 108 from accidentally disengaging from the first crossbar 78 of the primary frame 12.

FIG. 13 illustrates the securing of the plate 16 to the crossbar 100 of the secondary frame 22 while the secondary frame 22 is in the cart position. When the latch 20 is pulled outwards (to the left as viewed in FIG. 13), the crossbar 100 of the secondary frame 22 can be inserted into the groove 142 formed between the first lip 78 and the second lip 106. Once the crossbar 100 of the secondary frame 22 is positioned within the groove 142, the prong 108 is inserted through the slot 110 in the second lip 106 and through the slot 111 in the first lip 78. Thus, the latch 20 can secure the plate 16 in either the first or second positions as shown in FIGS. 10 and 13, respectively.

Figure 18:
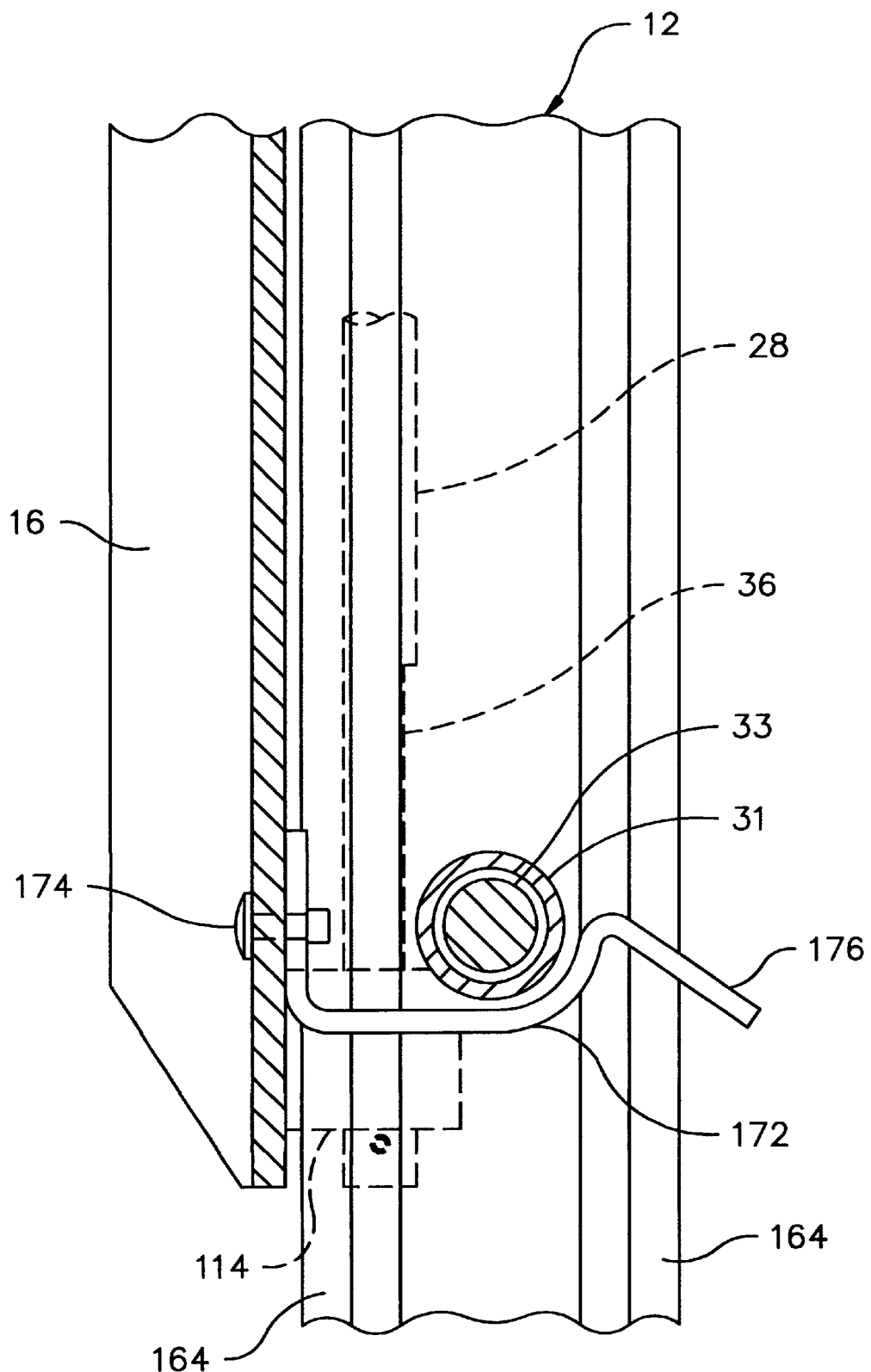
FIG. 18 is a greatly enlarged broken away view, partially in cross-section, of the hand truck of FIG. 17 taken along the line 18—18 of FIG. 17 illustrating a side view of the S-shaped grip.

When the latch 20 detachably secures the plate 16 to the first crossbar 70 as described above, the top of the plate 16 is prevented from moving out of the first position. Referring to FIGS. 17 and 18, the bottom of the plate 16 is secured in the first position by engaging the connecting chute 31 of the primary frame 12 via a S-shaped grip 172. The S-shaped grip 172 is essentially a piece of stamped stainless steel, or similar material, that is fastened to the inner surface of the plate 16 via a fastener 174, such as a rivet. The S-shaped grip 172 forms a protruding member 176 which grips the connecting chute 31 between the plate 16 and the protruding member 176. When the plate 16 is brought into the first position, the protruding member 176 of the S-shaped grip 172 is flexed outwardly as the connecting chute 31 is forced into the S-shaped grip 172. Once the connecting chute is fully inserted into the S-shaped grip 172, the protruding member 176 flexes inwardly and secures the bottom of the plate 16 in position.

Figure 23:
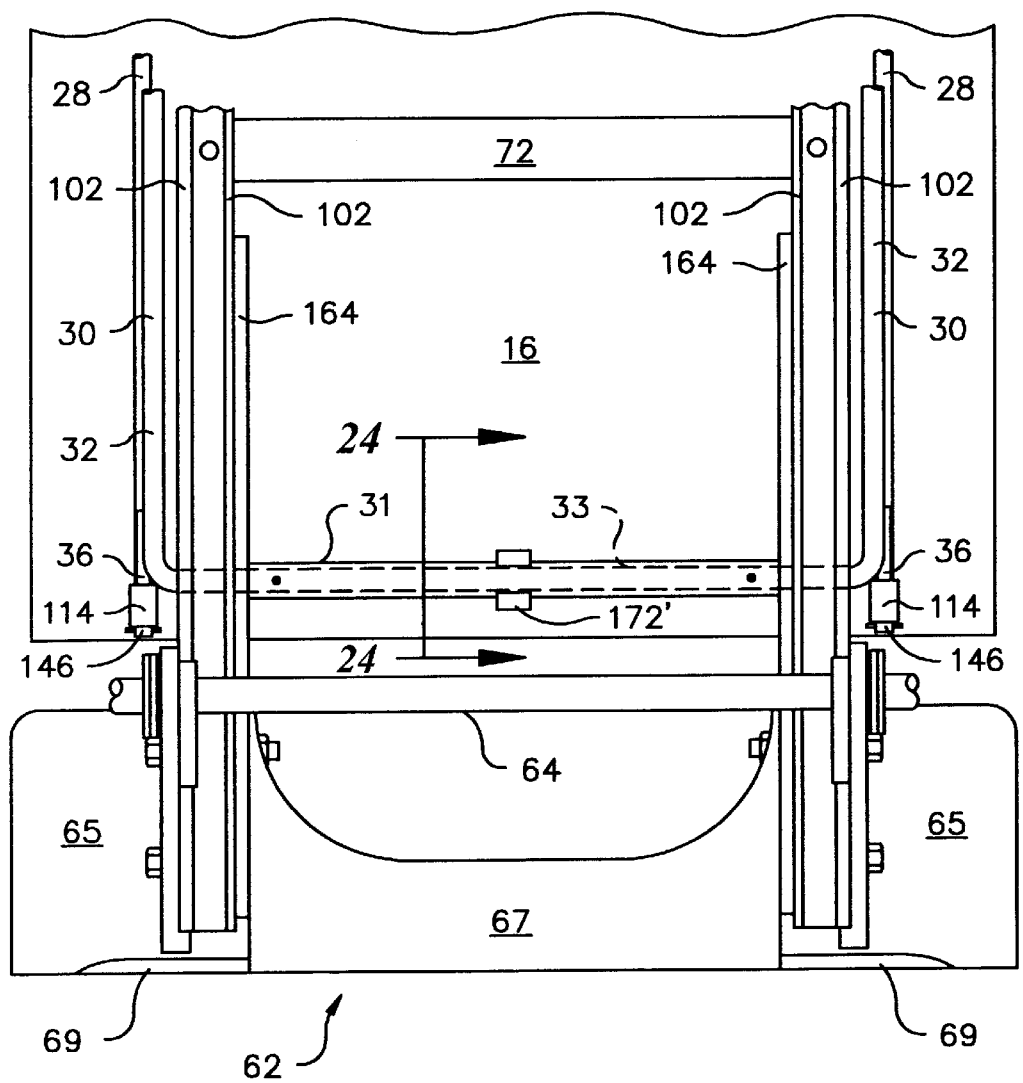
FIG. 23 is a broken away rear elevational view of the hand truck of FIG. 2 taken along the line 17—17 of FIG. 2 illustrating a second alternate method of securing the bottom of the plate in the first position using C-shaped grip.
Figure 24:
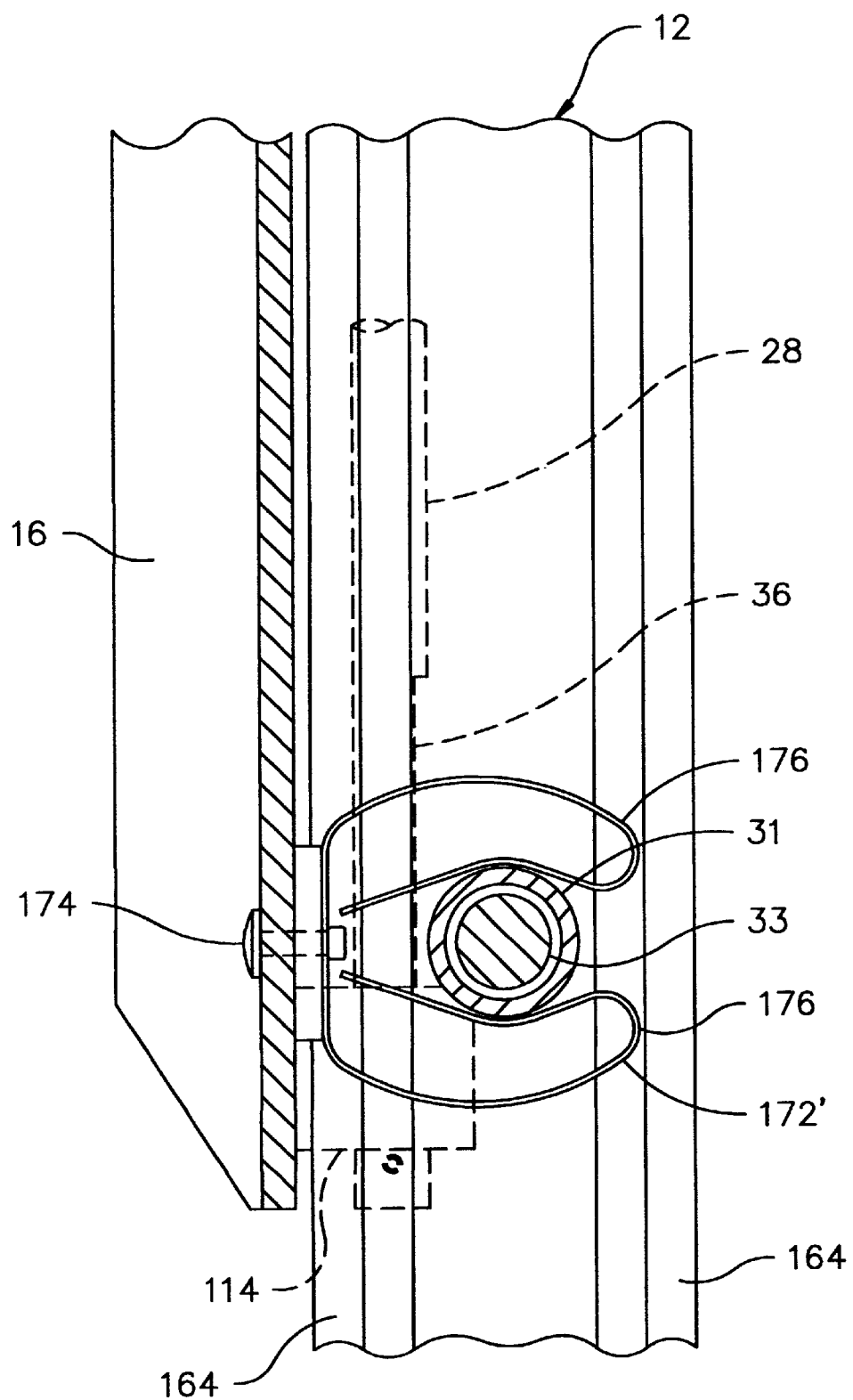
FIG. 24 is a greatly enlarged broken away view, partially in cross-section, of the hand truck of FIG. 23 taken along the line 24—24 of FIG. 23 illustrating a side view of the C-shaped grip.

While a S-shaped grip 172 is shown in FIGS. 17 and 18 as the preferred method of securing the bottom of the plate 16 for the hand truck shown in FIGS. 1–16, those of skill in the art will appreciate from this disclosure that alternate methods can be used without departing from the scope of the present invention. For example, detent mechanisms 26 can be used as shown in FIGS. 19–22 without effecting the operation of the hand truck 10. Referring to FIGS. 23 and 24, the bottom of the plate 16 may alternatively be held in place using a C-shaped grip 172'.

Figure 20:
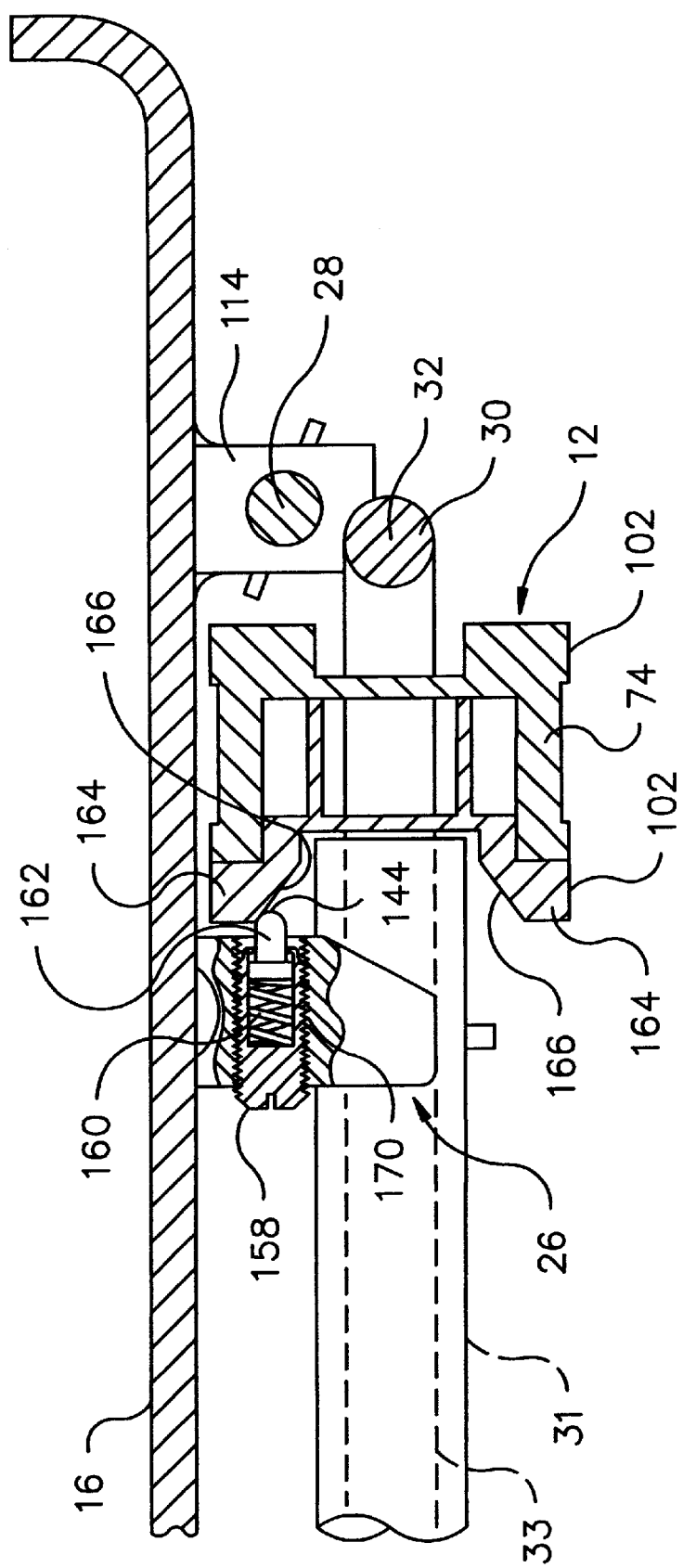
FIG. 20 is an enlarged cross-sectional view of the hand truck of FIG. 19 taken along the line 20—20 of FIG. 19.

As shown in FIGS. 19–22, the detent mechanisms 26 are attached to the rear or bottom side of the plate 16 proximate to the lower edge of the plate 16. Referring to FIG. 20, each detent mechanism has a threaded bore 170 in which a bushing 162 is partially housed. The bushing 162 extends rightward from the bore 170 to detachably engage an extended portion 164 of the vertical strut 74. The bushing 162 is preferably formed of a metallic material. However, those of skill in the art will appreciate from this disclosure that other materials, such as high density polymers, composites, or the like, can be used to form the bushings 162 without departing from the scope of the present invention.

The bushings 162 are biased outwardly by a coil spring 160 which is contained within the bore 170. The pressure with which the bushing 162 is outwardly biased is controlled by the positioning of a set screw 158. The bushing 162 contacts a beveled edge 166 of the extended portion 164 of the vertical strut 74. Referring to FIG. 20, while the beveled edge 166 is preferably the portion of the vertical strut 74 which engages the bushing 162, those of skill in the art will appreciate from this disclosure that the detent mechanism 26 can engage the vertical strut 74 using other methods, e.g., for example, engaging a hole (not shown) in the vertical flange 74, without departing from the scope of the present invention.

Thus, the tip 144 of the bushing 162 is elastically biased into engagement with the vertical strut 74 when the plate 16 is in the vertical position as shown in FIG. 20. Thus, a combination of the latch 20 (which is positioned on the top of the plate 16) and the detent mechanisms 26 (which are disposed proximate to the bottom of the plate) detachably secure the plate 16 in the first position.

A pair of guide bars 28 are mounted to the bottom of the plate 16 to enable the plate 16 to be movably attached to the primary frame 16. The guide bars 28 are generally parallel with the vertical struts 74 and are attached to the rear or bottom side of the plate 16 as shown in FIG. 19. The guide bars 28 are preferably secured to guide bar mounts 114 which are attached to the rear side of the plate 16 as shown in FIGS. 2, 5–7, 11, 12, 14–16, 19, 21*a,* 21*b,* and 22. The guide bar mounts 114 are positioned generally proximate to the four corners of the plate 16. While the guide bar mounts 114 are preferably separate pieces from the plate 16 which are attached by a weld or suitable fastener, those of skill in the art will appreciate from this disclosure that the guide bar mounts 114 can be integrally formed with the plate 16 without departing from the scope of the present invention.

The guide bars 28 are each inserted through two guide bar mounts 114 and are secured on each end by a cap and pin combination 146 as shown in FIGS. 15A–17, 19, 21*a,* 21*b* and 22. While it is preferable that the guide bars 28 are separate pieces from the plate 16, those of skill in the art will appreciate from this disclosure that the guide bars 28 can be integrally formed with the plate 16 without departing from the scope of the present invention.

Figure 11:
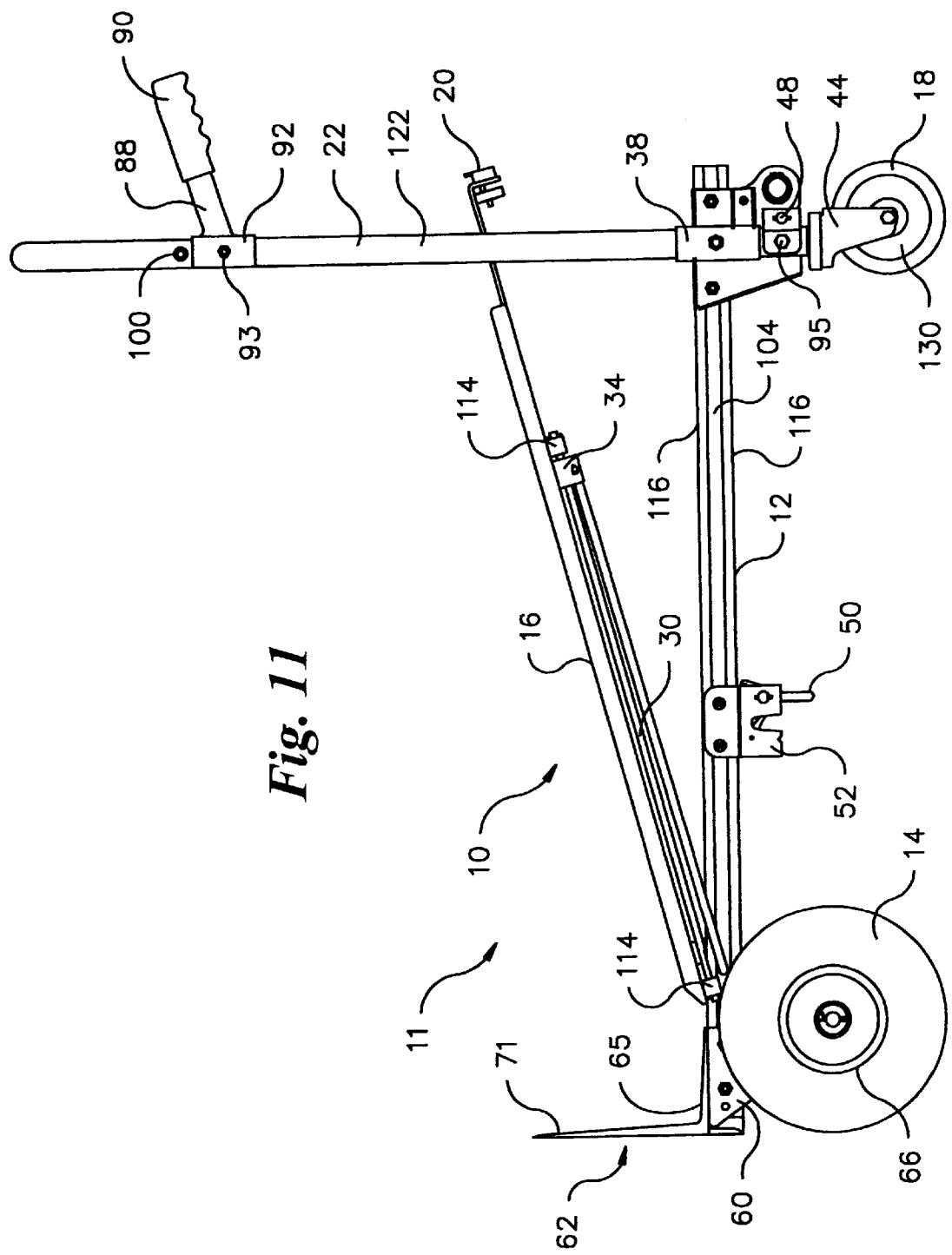
FIG. 11 is a right side elevational view of the hand truck of FIG. 1 in the cart position illustrating the plate in the process of being rotated into a second position to form an elevated tabletop surface.
Figure 12:
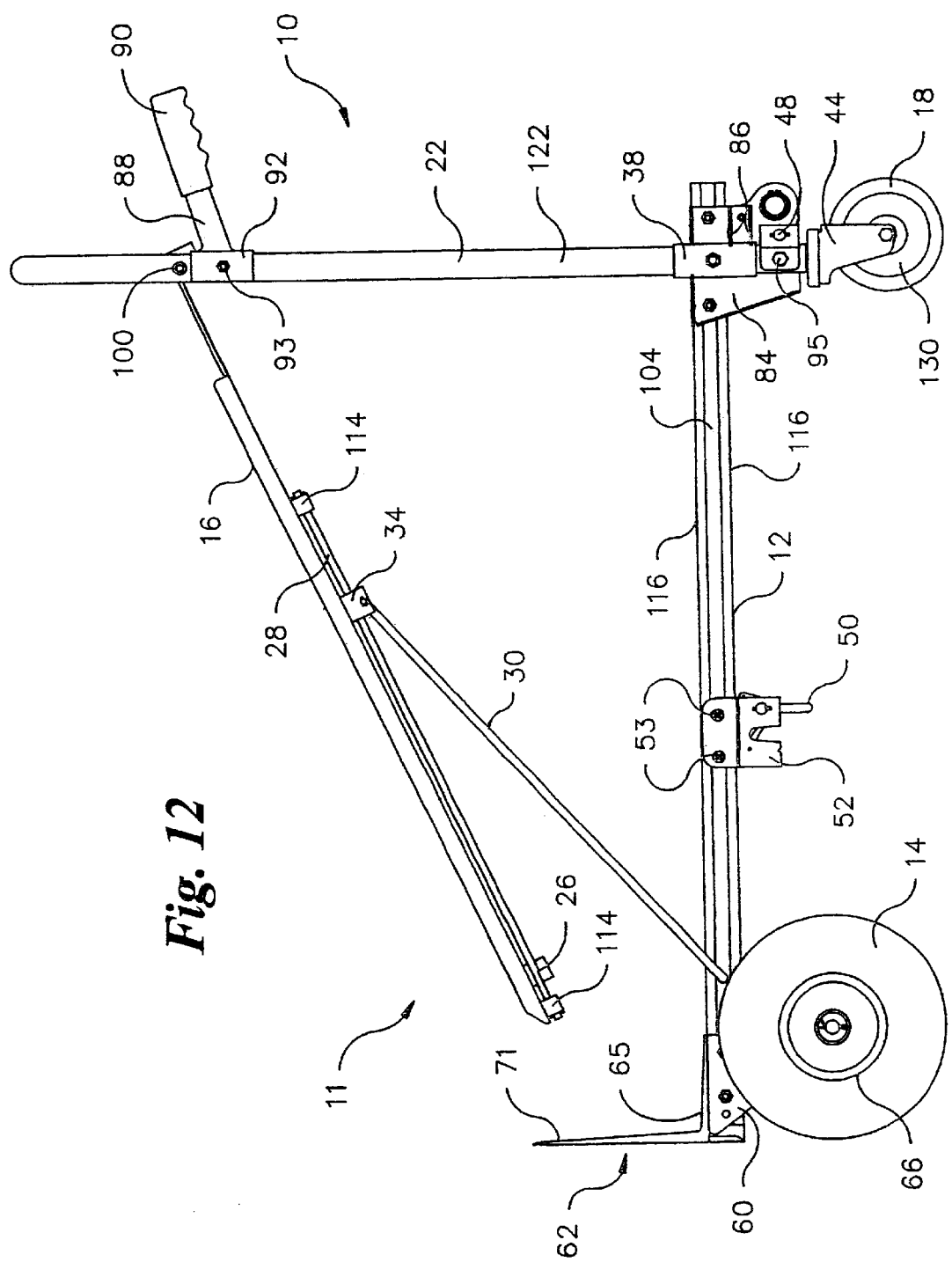
FIG. 12 is a right side elevational view of the hand truck of FIG. 1 in the cart position illustrating the plate with a top end latchably secured to a croosbar of the secondary frame.

A pair of arms 30 is pivotally mounted to the primary frame 12 and is slidably engaged with the pair of guide bars 28. Referring to FIGS. 17 and 19, the pair of arms 30 is pivotally mounted to the vertical struts 74 proximate to the lower edge of the plate 16 when the plate 16 is in the first position. Referring to FIGS. 11, 12, and 14, the arms 30 (only one of which is viewable) slide from the right end of the guide bars 28 toward the left end of the guide bars 28 as the plate 16 is moved from the first position into the second position. Referring to FIGS. 17 and 19, it is preferable that the pair of arms 30 forms part of a U-shaped member 32. The U-shaped member 32 is formed by the two arms 30 which are connected by a transverse member 33 which extends from the outer surface of the left vertical strut to the outer surface of the right vertical strut 74. Referring to FIGS. 17, 19 and 20, the transverse member 33 is positioned within a chute 31 that extends perpendicularly between the two vertical struts 74 proximate to the bottom of the vertical struts 74. While the chute 31 is preferably cylindrical in shape, those of skill in the art will appreciate from this disclosure that the chute 31 may have other shapes without departing from the scope of the present invention.

By forming the pair of arms 30 from a single U-shaped member 32, the rotation of the arms 30 is synchronized. While it is preferred that the pair of arms 30 are part of a U-shaped member 32, those of skill in the art will appreciate from this disclosure that the pair of arms 30 may be separate components that are each separately attached to the primary frame 12 without departing from the scope of the present invention.

Figure 16:
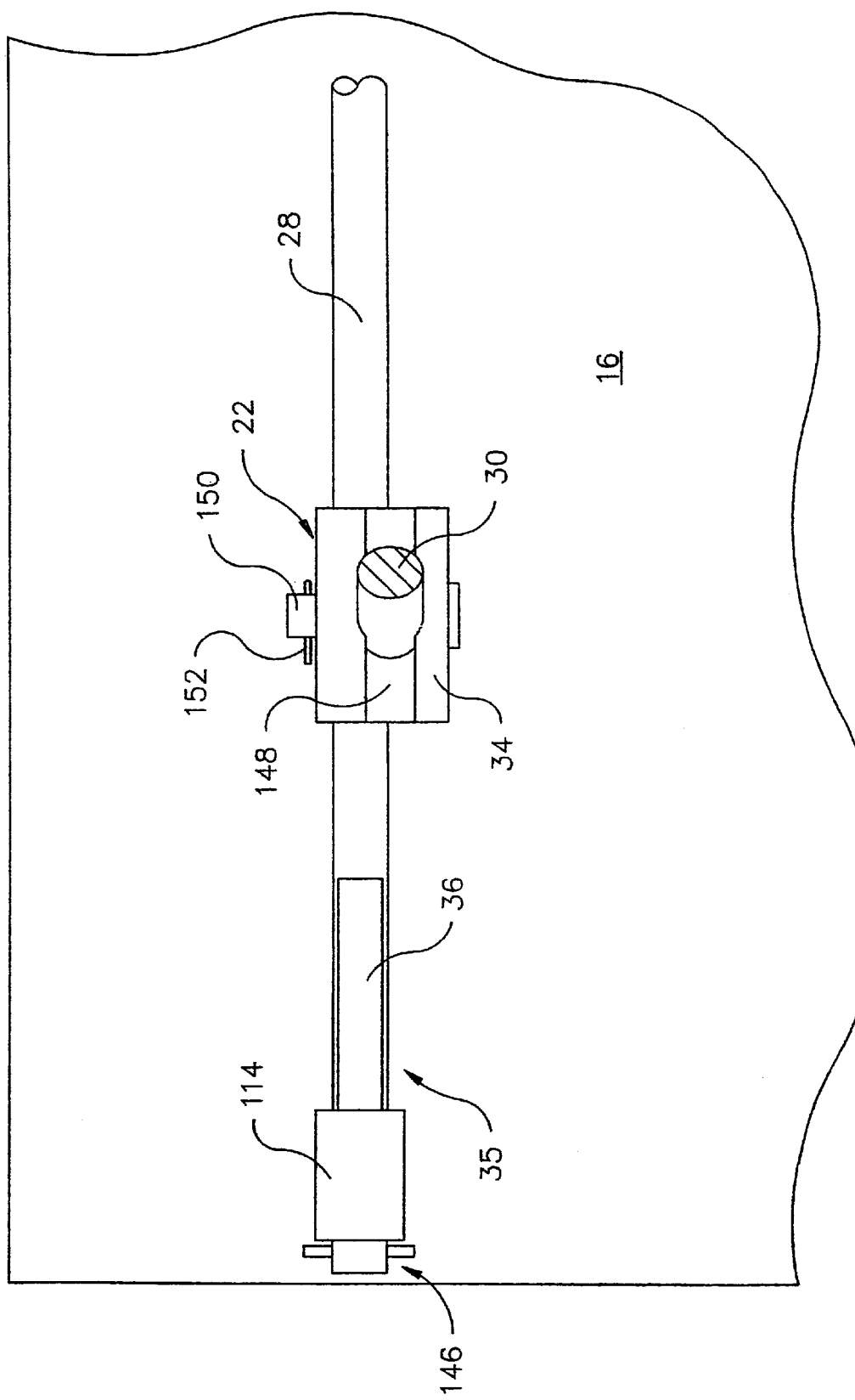

Each of the pair of arms 30 is slidably connected to one of the guide bars 28 via a block 34 that it is slidably disposed on one of the pair of guide bars 28. Referring to FIGS. 15*a*–16 and 21*a*–22, each guide bar 28 is inserted through a block 34 which is slidably disposed thereover. The arms 30 are each inserted inside a hollow 148 within the bottom of one of the blocks 34 as shown in FIG. 16. The arms 30 are rotatably attached to the block 34 via a pin 150 which is secured using a cotter pin 152. Thus, it is the blocks 34 that enable the pair of arms 30 to be slidably engaged with the guide bars 28.

While it is preferable that a block 34 is used to attach each of the guide bars 28 to one of the arms 30, those of skill in the art will appreciate from this disclosure that other methods of engaging the arms 30 with the plate 16 can be used without departing from the scope of the present invention. For example, the pair of arms 30 can each engage a groove in the rear side of the plate 16.

Referring the FIGS. 15*a,* 16, 21*a,* and 22, a locking mechanism 35 is disposed on each of the pair of guide bars 28 to secure the pair of arms 30 in position thereon. Each locking mechanism 35 is preferably disposed on the left end of one of the guide bars 28 (as viewed in FIGS. 14–16 and 21*a*) to secure the left end of the plate 16 in the second position. Thus, the combination of the latch 20 (which engages the crossbar 100 of the secondary frame 22) and the locking mechanism 35 (which secures the arms 30 in the position shown in FIG. 14) secures the plate 16 in the second position. The preferred locking mechanism 35 includes a recess 36 in each of the pair of guide bars 28. The recess 36 is interlockable with each block 34 to prevent the blocks 34 from sliding over the pair of guide bars 28 after engaging the recess 36.

Figure 21A:
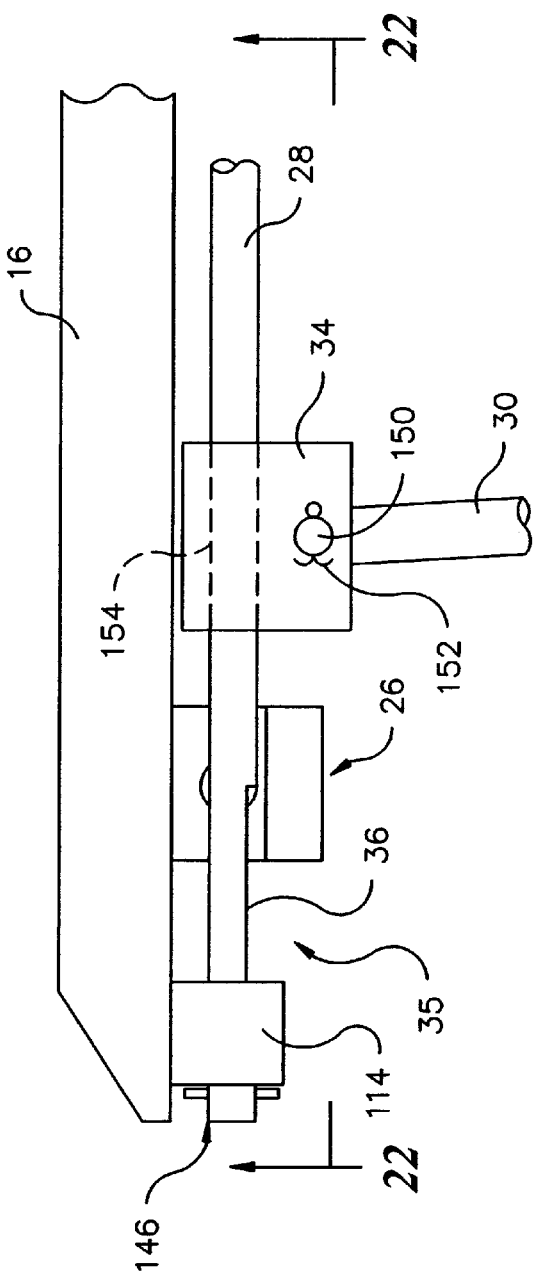
FIG. 21a is an enlarged partial right side elevational view of the hand truck of FIG. 19 illustrating a block connection between one of a pair of arms (that are pivotally attached to the hand truck) and one of a pair of guide bars (that are attached to the plate)
Figure 21B:
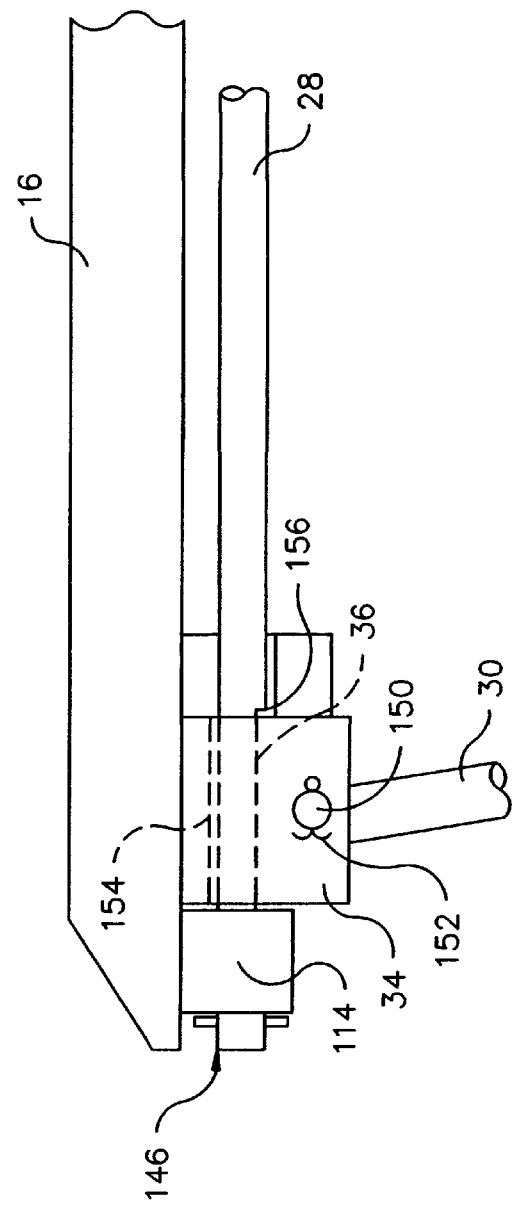
FIG. 21b is a partial right side elevational view of the hand truck of FIG. 19 illustrating one of the blocks locked in position by a recess in one of the guide rails.

Referring to FIGS. 15*a* and 21*a,* each block 34 has a bore 154 through which one guide bar 28 is slidably inserted. Referring to FIGS. 15*b* and 21*b,* when the block 34 slides completely over the recess 36, the guide bar 28 is displaced slightly downward as the base of the recess 36 contacts the lower surface of the bore 154. This causes the lip 156 (which is formed by the recess 36) of the guide bar 28 to abut the block 34. The interaction between the blocks 34 and the respective lips 156 of the guide bars 28 secures the pair of arms 30 in position relative to the guide bars 28.

To disengage the block 34 from the locking mechanism 35, it is necessary to lift the left end of the plate 16 upwards to cause the top of the guide bars 28 to abut the top surface of the bores 154. This causes the lips 156 of the guide bars 28 to be slidably insertable into the bores 154 and thus, allows the blocks 34 to slide along the guide bars 28. While the preferred locking mechanism 35 is a recess 36 located proximate to an end of each guide bar 28, those of skill in the art will appreciate from this disclosure that any locking mechanism can be used that is capable of securing the arms 30 in position on the guide bars 28 without departing from the scope of the present invention.

As detailed above, the secondary frame 22 is slidably mounted within a collar 38 that is pivotally mounted to the primary frame 12. The collars 38 each house a bushing 40 that is disposed against one of the legs 122 of the secondary frame 22 to reduce the speed with which the secondary frame 22 slides through the collars 38.

The bushing 40 is mounted within the speed reducing mechanism and is is biased by an elastic member 42 which is adjusted using a set screw (in a fashion similar to the above-described detent mechanisms 26) as shown in FIG. 8. Thus, it is the elastic member 42 which pushes the bushing 40 against the leg 122 of the secondary frame 22 to reduce the speed with which the secondary frame 22 slides through the collar 38. The bushing 40 is preferably a nylon-tipped ball. However, those of skill in the art will appreciate that any suitable high-friction, durable, anti-wear material can be used as the bushing 40. The elastic member 42 biases the bushing 40 into contact with the leg 122 of the secondary frame 22 to reduce the speed with which the secondary frame 22 slides through the collar 38.

A separate speed reducing mechanism 39 is preferably housed in each of the collars 38 to exert a speed reducing force on each leg 122 of the secondary frame 22. While it is preferable that a speed reducing mechanism 39 be disposed in each collar 38, those of skill in the art will appreciate from this disclosure that the present invention is not limited to collars 38 having speed reducing mechanisms 39.

Referring to FIGS. 1–18, the hand truck 10 of the present invention operates as follows. To convert the hand truck 10 from the configuration of a typical hand truck into a cart having an elevated tabletop surface, the cam lock release handle 50 is rotated in the clockwise direction (as viewed in FIG. 2) to release the secondary frame 22 from the hand truck position. Then, the secondary frame 22 is free to rotate in the counterclockwise direction shown by the arrow denoted "A" in FIG. 5.

Figure 7:
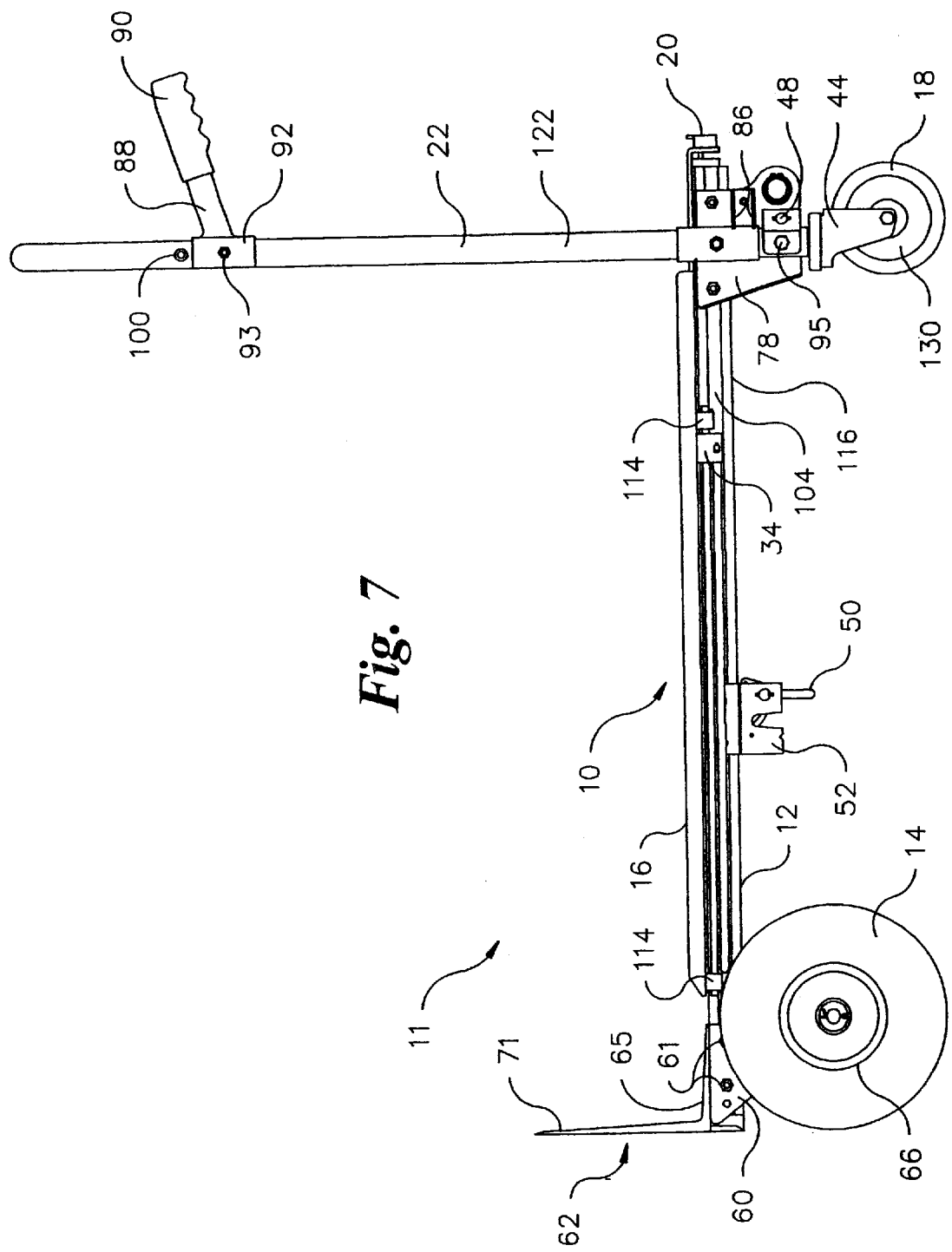
FIG. 7 is a right side elevational view of the hand truck of FIG. 1 converted into a cart with the secondary frame in the cart position and with a plate in the first position.

As the secondary frame 22 is rotated in the counterclockwise direction, the secondary frame 22 is slid upwards through the collars 38 as shown in FIG. 6. Once the secondary frame 22 is generally perpendicular to the primary frame 12 and slid completely through the collars 38 as shown in FIG. 7, the upper flanges 84 secures the catches 46 and the cart axle 48 in the catch securing grooves 82 and the axle securing grooves 80, respectively. Thus, the hand truck 10 is now converted into a cart or dolly.

Next, the latch 20 that is mounted on the plate 16 is pulled outwards to disengage the prong 108 from the first crossbar of the primary frame 12 to allow the right end of the plate 16 to be lifted upwards as shown in FIG. 11. While lifting the plate 16 upwards, the S-shaped grip 172 is disengaged from the connecting chute 31 of the primary frame 12 and the left side of the plate 16 is lifted away from the primary frame 12 as viewed in FIG. 12.

Then, the crossbar 100 of the secondary frame 22 is inserted into the groove 142 formed by the first and second lips 78, 106 of the plate 16. While the crossbar 100 is being inserted into the groove 142, the prong 108 of the latch 20 is disengaged from slots 111, 110 in the first and second lips 78, 106 to allow the crossbar 100 to completely enter the groove 142 (as shown in FIG. 13). Once the crossbar 100 abuts the rear side of the plate 16, the latch 20 is positioned so that prong 108 secures the crossbar 106 within the groove 142 as shown in FIG. 13.

Afterwards, the left side of the plate 116 is positioned in a generally parallel orientation relative to the primary frame 12 causing the pair of arms 30 to rotate counterclockwise and causing the blocks 34 to engage the respective locking mechanism 35 positioned on each guide bar 28. Once the blocks 34 that are attached to the aims 30 engage their respective recesses 36 in the guide bars 28, the lips 156 of the guide bars 28 abut the corresponding blocks 34 to fix the position of the pair of arms 30 relative to the pair of guide bars 28. Thus configured, the hand truck 10 of the present invention is converted into a cart having an elevated tabletop surface which is formed by the plate 16. To return the hand truck 10 from its cart position into the position of a typical hand truck, the above steps are reversed until the hand truck 10 is positioned as shown in FIG. 2.

As is clear from the foregoing details, this efficient design of a hand truck 10 which is convertible into a cart 11 provides an elevated tabletop surface without requiring extra components to be separately stored or transported because the extra components are not permanently attached to the hand truck 10. The complete integration of an adjustable elevated tabletop surface with a hand truck that is convertible into a cart allows users to more simply and conveniently incorporate the hand truck 10 into their daily routine.

From the foregoing description, it can be seen that the present invention comprises a hand truck which is convertible into a cart having an elevated tabletop surface that facilitates both the use and storage of the hand truck 10. It will be appreciated by those skilled in the art that many changes and modifications may be made to the above-described embodiment without departing from the inventive concept thereof. It is understood, therefore, that the present invention is not limited to the particular embodiment disclosed, but is intended to include all modifications and changes which are within the scope and spirit of the invention as defined by the appended claims.

I claim the following:

1. A hand truck that is convertible to a cart, comprising:
   a primary frame having a first pair of wheels rotatably mounted thereon and a pair of arms pivotally mounted thereon;
   a secondary frame pivotally attached to said primary fame and having at least one additional wheel rotatably mounted thereon, said secondary frame being movable between a hand truck position, generally parallel to said primary frame, and a cart position, generally perpendicular to said primary frame, said secondary frame, while in said cart position, causing said at least one additional wheel, in combination with said first pair of wheels, to be capable of supporting said primary frame; and
   a plate movably attached to said primary frame and adjustable between a first position, generally parallel to and contacting said primary frame, and a second position, generally parallel to and spaced apart from said primary frame, said plate having a pair of guide bars mounted thereon, which are slidably engaged with said pair of arms.

2. The hand truck of claim 1, further comprising a latch disposed on said plate, said latch being interlocked with said primary frame while said plate is in said first position and being interlocked with said secondary frame while said plate is in said second position and said secondary frame is in said cart position to secure said plate in said first and second positions, respectively.

3. The hand truck of claim 1, wherein said pair of arms form part of a U-shaped member that is rotatably mounted through said primary frame.

4. The hand truck of claim 1, further comprising each of said pair of arms being slidably connected to one of said pair of guide bars via a block slidably disposed on one of said pair of guide bars.

5. The hand truck of claim 4, further comprising a locking mechanism disposed on each of said pair of guide rails for securing said pair of arms in position thereon.

6. The hand truck of claim 5, wherein said locking mechanism comprises a recess in one of said pair of guide rails, said recess being interlock able with said block to prevent said block from sliding over one of said pair of guide rails after engaging said recess.

7. The hand truck of claim 5, wherein said secondary frame is slidably mounted within a collar that is pivotally mounted to said primary frame; said collar housing a bushing that is disposed against said secondary frame to reduce a speed with which said secondary frame slides through the collar.

8. The hand truck of claim 7, wherein said bushing is biased by an elastic member.

9. A hand truck that is convertible to a cart, comprising:
   a primary frame having a first pair of wheels rotatably mounted thereon and a pair of arms pivotally mounted thereon;
   a secondary frame pivotally attached to said primary frame and having at least one additional wheel rotatably mounted thereon, said secondary frame being movable between a hand truck position, generally parallel to said primary fame, and a cart position, generally perpendicular to said primary frame, said secondary frame, while in said cart position, causing said at least one additional wheel, in combination with said first pair of wheels, to be capable of supporting said primary frame;

a plate movably attached to said primary frame and adjustable between a first position, generally parallel to and contacting said primary frame, and a second position, generally parallel to and spaced apart from said primary frame, said plate having a pair of guide bars mounted thereon which are slidably engaged with said pair of arms; and a latch disposed on said plate and biased into a locked position by an elastic member, said latch being interlocked with said primary frame while said plate is in said first position and being interlocked with said secondary frame while said plate is in said second position and said secondary frame is in said cart position to secure said plate in said first and second positions, respectively.

10. A hand truck that is convertible to a cart, comprising:

a primary frame having a first pair of wheels rotatably mounted thereon and a pair of arms pivotally mounted thereon;

a secondary frame pivotally attached to said primary frame and having at least one additional wheel rotatably mounted thereon, said secondary frame being movable between a hand truck position, generally parallel to said primary frame, and a cart position, generally perpendicular to said primary frame, said secondary frame, while in said cart position, causing said at least one additional wheel, in combination with said first pair of wheels, to be capable of supporting said primary frame;

a plate movably attached to said primary frame and adjustable between a first position, generally parallel to and contacting said primary frame, and a second position, generally parallel to and spaced apart from said primary frame, said plate having a pair of guide bars mounted thereon which are slidably engaged with said pair of arms; and a latch disposed on said plate, said latch being interlocked with said primary frame while said plate is in said first position and being interlocked with said secondary frame while said plate is in said second position and said secondary frame is in said cart position to secure said plate in said first and second positions, respectively and one of a S-shaped grip and a C-shaped grip that, in combination with said latch, detachably secures said plate in said first position.

\* \* \* \* \*